(12) United States Patent
Teague et al.

(10) Patent No.: US 6,761,036 B2
(45) Date of Patent: Jul. 13, 2004

(54) BEVERAGE DISPENSER WITH INTEGRAL ICE MAKER

(75) Inventors: Merritt T. Teague, Jeffersonville, IN (US); Richard K. Renken, Chesterfield, MO (US); Jerry L. Landers, Memphis, IN (US)

(73) Assignee: Manitowoc Foodservice Companies, Inc., Sparks, NV (US)

(*) Notice: Subject to any disclaimer, the term of this patent is extended or adjusted under 35 U.S.C. 154(b) by 0 days.

(21) Appl. No.: 10/274,449

(22) Filed: Oct. 18, 2002

(65) Prior Publication Data

US 2003/0101735 A1 Jun. 5, 2003

Related U.S. Application Data

(60) Provisional application No. 60/343,518, filed on Oct. 19, 2001.

(51) Int. Cl.[7] ................................................. B67D 5/62
(52) U.S. Cl. ............................ 62/70; 62/389; 222/129.1
(58) Field of Search ........................... 62/344, 389, 390, 62/70; 222/129.1, 146.6

(56) References Cited

U.S. PATENT DOCUMENTS

| | | | |
|---|---|---|---|
| RE30,301 E | | 6/1980 | Zygiel |
| 4,276,751 A | | 7/1981 | Saltzman et al. |
| 4,489,566 A | | 12/1984 | Saltzman |
| 4,617,807 A | | 10/1986 | Pritchett et al. |
| 4,678,104 A | | 7/1987 | Pritchett |
| 4,843,830 A | * | 7/1989 | Haul .............................. 62/59 |
| 5,104,007 A | | 4/1992 | Utter |
| 5,156,871 A | | 10/1992 | Goulet et al. |
| 5,163,298 A | | 11/1992 | Hassell et al. |
| 5,218,830 A | | 6/1993 | Martineau |
| 5,230,448 A | * | 7/1993 | Strohmeyer et al. ......... 222/643 |
| 5,245,841 A | | 9/1993 | Paul et al. |
| 5,249,710 A | | 10/1993 | Hassell et al. |
| 5,279,446 A | | 1/1994 | Cook et al. |
| 5,353,958 A | * | 10/1994 | Hawkins ....................... 222/54 |
| 5,363,671 A | * | 11/1994 | Forsythe et al. .............. 62/197 |
| 5,368,198 A | | 11/1994 | Goulet |
| RE34,834 E | | 1/1995 | Swanson |
| 5,445,290 A | * | 8/1995 | Forsythe et al. .......... 222/129.1 |
| 5,487,492 A | | 1/1996 | Goulet |
| 5,492,250 A | * | 2/1996 | Sardynski .................... 222/108 |
| 5,499,744 A | | 3/1996 | Hawkins |
| 5,524,452 A | | 6/1996 | Hassell et al. |
| 5,542,572 A | | 8/1996 | Davis |
| 5,660,307 A | | 8/1997 | Schroeder et al. |
| 5,787,723 A | * | 8/1998 | Mueller et al. ................ 62/347 |

(List continued on next page.)

OTHER PUBLICATIONS

Search Report dated Dec. 3, 2003, for corresponding international application No. PCT/US02/33283.

Primary Examiner—William E. Tapolcai
(74) Attorney, Agent, or Firm—Brinks Hofer Gilson & Lione

(57) ABSTRACT

A dispenser for soft-drinks and ice has an integral ice maker. The compressor and condenser for the ice making refrigeration system are located remotely from the ice making apparatus. Thus, the dispenser with an integral ice maker does not emit noise and heat from the compressor and condenser in the customer service areas where ice and soft drinks are dispensed. Refrigerant vapor is drawn from a receiver and is used for defrosting in the harvest portion of the ice making cycle. The dispenser also has an internal heat exchanger for cooling carbonated water and syrup prior to dispensing a soft drink. There is also an ice maker and dispenser, having a refrigeration system in which ice-making components and an ice dispenser are located near a customer-service area, while the hot and noisy refrigeration components are located remotely.

73 Claims, 16 Drawing Sheets

U.S. PATENT DOCUMENTS

| | | | |
|---|---|---|---|
| 5,829,646 A | 11/1998 | Schroeder et al. | |
| 5,901,884 A | 5/1999 | Goulet et al. | |
| 5,967,367 A * | 10/1999 | Orsborn | 222/30 |
| 5,987,900 A * | 11/1999 | Love | 62/66 |
| 6,039,220 A | 3/2000 | Jablonski et al. | |
| 6,041,970 A | 3/2000 | Vogel | |
| 6,058,986 A | 5/2000 | Bethuy et al. | |
| 6,109,043 A | 8/2000 | Lu et al. | |
| 6,152,325 A | 11/2000 | Edwards | |
| 6,196,007 B1 | 3/2001 | Schlosser et al. | |
| 6,202,894 B1 * | 3/2001 | Struminski et al. | 222/129.3 |
| 6,209,339 B1 | 4/2001 | Schroeder et al. | |
| 6,266,945 B1 | 7/2001 | Schroeder | |
| 6,305,177 B1 | 10/2001 | Edwards et al. | |
| 6,321,802 B1 | 11/2001 | Weeks et al. | |
| 6,321,812 B1 | 11/2001 | Kral | |
| 6,324,850 B1 | 12/2001 | Davis | |
| 6,334,328 B1 | 1/2002 | Brill | |
| 6,343,481 B2 * | 2/2002 | Simmons et al. | 62/298 |

* cited by examiner

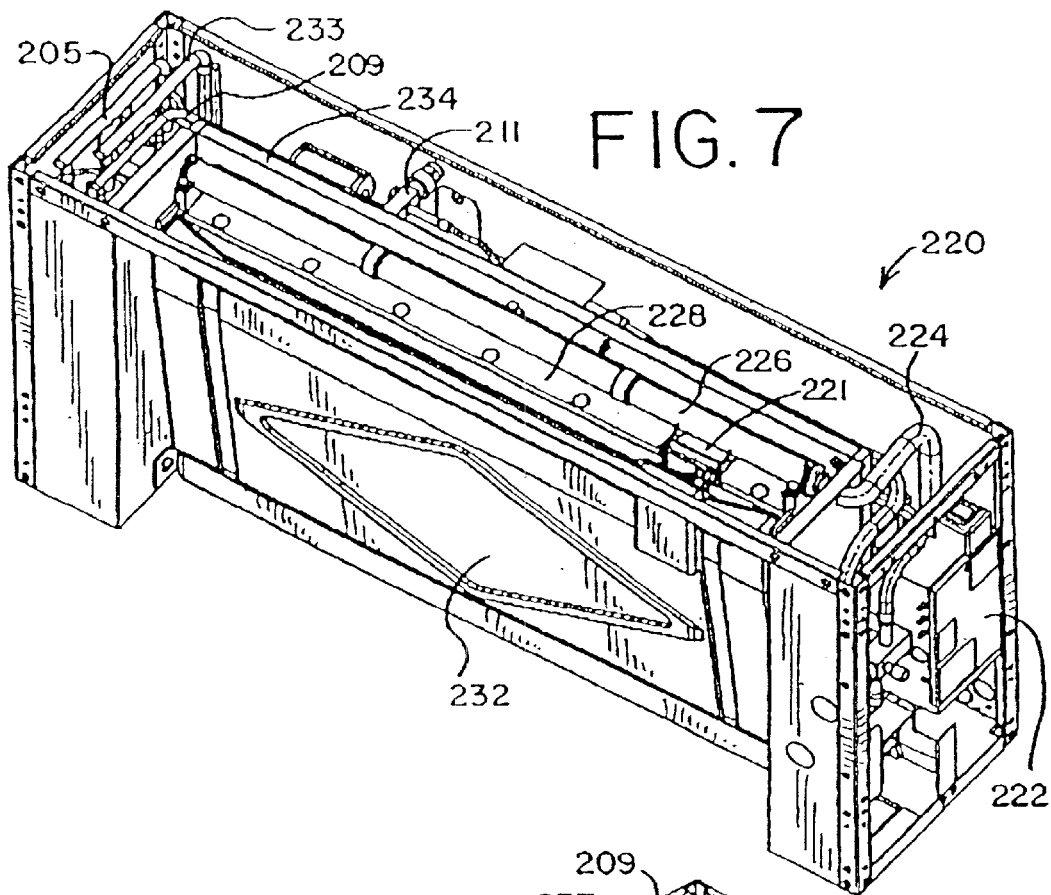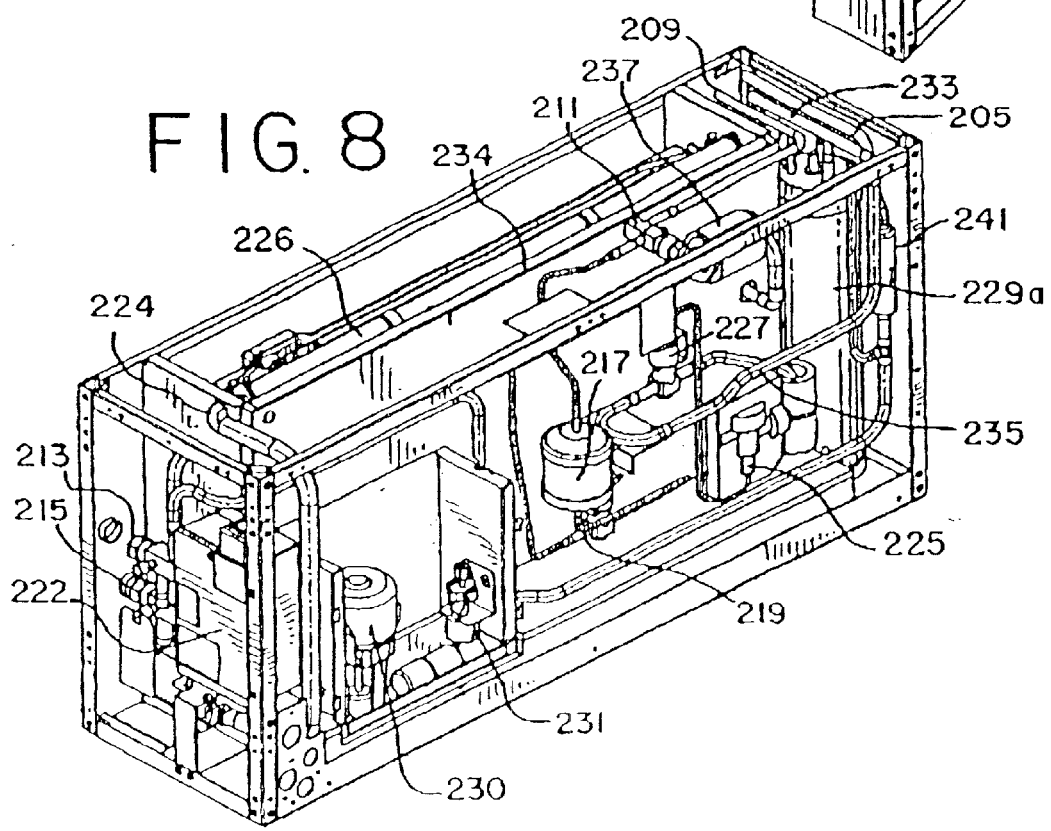

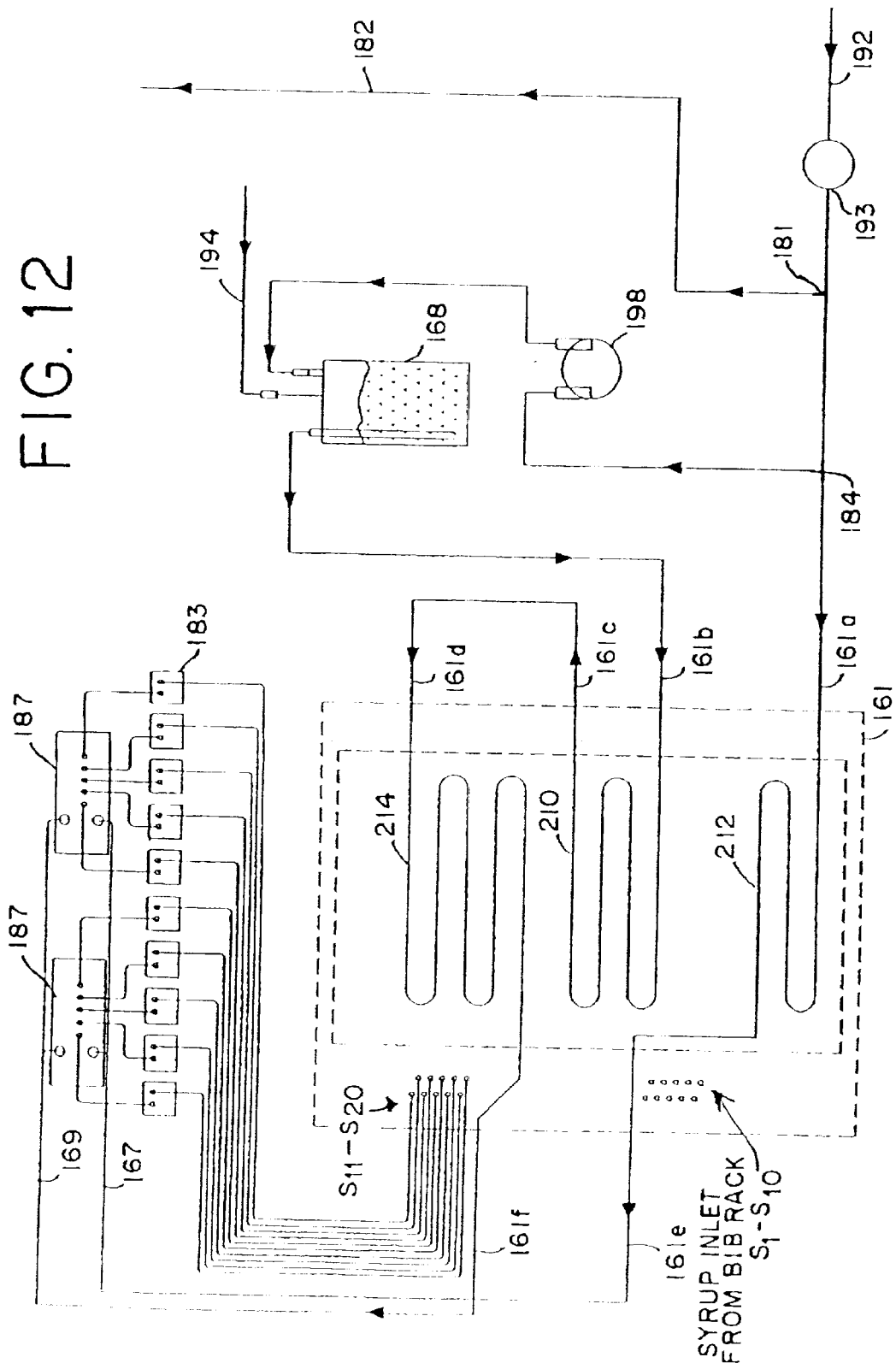

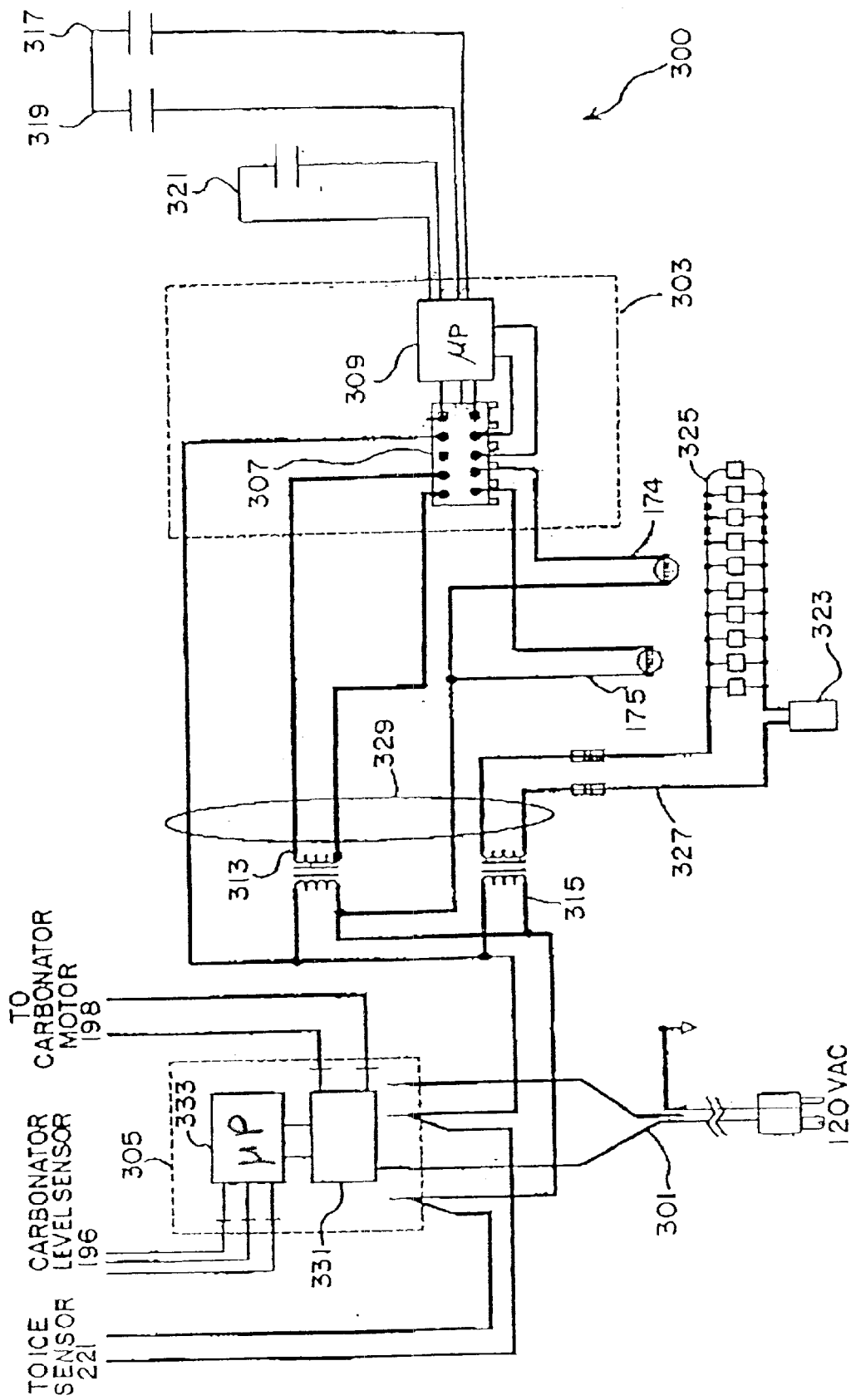

BEVERAGE DISPENSER WITH INTEGRAL ICE MAKER

This application claims the benefit of the filing date under 35 U.S.C. §119(e) of Provisional U.S. patent application Ser. No. 60/343,518, filed on Oct. 19, 2001, which is hereby incorporated by reference in its entirety.

FIELD OF THE INVENTION

The present invention relates to beverage dispensing machines, ice dispensing machines, and particularly relates to soft-drink or other beverage dispensing machines that also make ice for customers, along with post-mixing a soft drink.

BACKGROUND OF THE INVENTION

Fast-service restaurants are busy establishments where every square inch of floor space is at a premium. Such establishments typically very busy, where customers demand quick service. Their demands include not only a hot meal, but also a cold beverage, all at a very fast pace. As a result, every piece of food service equipment and movement of employees has been well-engineered to attain quick service and fast customer turnover. At the same time, high customer satisfaction is also desired. One way to achieve high satisfaction is to insure that each customer's order is correct, that the food served is hot, and that the beverage is cold. The present invention helps to insure that the beverage served to the consumer will be cold, while still maintaining fast service and quick turnover.

The beverage served with a meal is an important component of the meal. Some of the opportunities for improvement in the ice and beverage area include a need to produce and store ice for peak demand periods, and the resulting need for space for that accumulation. Once ice is produced and stored, it must be dispensed, preferably in an automatic or "hands-off" manner, so that employee or customer contact with the ice is avoided. Equipment must be designed to dispense not only the beverage but the ice as well.

Present ice and beverage dispensers are not as well-engineered as they could be to achieve these goals. As one example, U.S. Pat. No. 34,337 discloses a soft-drink dispenser to which ice must be added periodically. Not only does this require the time of an employee, but soft-drink dispensers according to this patent frequently have an ice bin well above a convenient service level, that is, about chest-high for an employee or a consumer. Thus, an employee may be required to climb a ladder and dump ice into the bin from a high level, above the top of the bin. While not extraordinary demanding, the situation may be compounded by a long trip to an ice storage area in the rear of the restaurant, as well as numerous other employees or customers in the area of the ice dispenser. Thus, the trip to retrieve ice and replenish the ice and beverage dispenser may take time, inconvenience customers, and present an opportunity for accidents in a fast-paced area.

The situation may be remedied, in one way, by placing the ice machine up-front near the soft-drink and ice dispensing machine. This "solution" may have several disadvantages, however. Ice-making machines take up a great deal of space; ice-making machines in the serving area or on the dining area floor also will not transport the ice several feet vertically into a dispenser; finally, ice-making machines tend to be very noisy, giving off heat as well as noise, as described in U.S. Pat No. 5,732,563. With these characteristics, an ice making machine near the point of dispensing would be very convenient but would also be very undesirable to consumers as well as to employees. When ceiling heights allow for it, an ice making machine is sometimes placed on top of a beverage and ice dispenser. However, this is not always possible, and does nothing to avoid the noise problem.

A remedy for the situation would be a soft-drink and ice dispensing machine that could be placed in a food-service or dining area, would make ice, and would deposit the ice in a position sufficiently high for dispensing. This soft-drink dispensing, ice-making machine would not suffer from the advantages of present ice-making machines, with a refrigeration system that gives off large amounts of undesirable mechanical noise and heat. The machine would also not require employees to get on ladders to service or clean the machine.

SUMMARY

A beverage dispenser with an integral ice maker has been invented. The dispenser comprises a water system including at least one pump, an ice-forming mold, and interconnecting lines therefor. The dispenser also comprises a refrigeration system with a compressor, a condenser, at least one evaporator in heat exchange relationship with the ice forming mold, and at least one receiver having an inlet connected to the condenser. The refrigeration system also comprises a liquid outlet connected to an expansion device and a vapor outlet connected by a valved passageway to the evaporator, wherein the compressor and the condenser are remote from the evaporator. There is also an ice bin for receiving ice made by the water system and the refrigeration system, and at least one mixing valve for mixing and dispensing syrup and carbonated water chilled by ice made by the refrigeration system. There is also a housing, wherein the water system, at least a portion of the refrigeration system, and the ice bin are located within the housing.

Another aspect of the invention is a method of producing and dispensing a beverage. The method comprises producing ice with a refrigeration system having an evaporator remote from a compressor and condenser, the evaporator being housed inside a housing that also houses a beverage dispenser. The method then comprises harvesting and storing the ice adjacent to a heat exchanger, and cooling water and syrup in said heat exchanger by exchanging heat with the ice. The cooled water and syrup are then mixed to form a beverage, and the method includes dispensing the beverage. There are many other aspects of the invention, including the use of vaporous refrigerant during a harvest cycle of the beverage dispenser.

Another aspect of the invention is a beverage dispenser with an integral ice maker. The beverage dispenser comprises a housing and a carbonation system within the housing, and connections to sources of carbon dioxide and water, and a carbonator pump within the housing for pumping carbonated water. The beverage dispenser also comprises a water system within the housing comprising a water pump and ice-forming equipment, and a refrigeration system having an evaporator, a condenser, a compressor, an expansion device, and at least one receiver, the evaporator being located within the housing and the condenser and compressor being located outside the housing, and the at least one receiver having an inlet connected to the condenser, a vapor outlet connected to the evaporator by a valved passageway, and a liquid outlet connected to the expansion device which is connected in turn to the evaporator. The beverage dispenser also comprises an ice bin within the housing for receiving ice made by the refrigeration system; and a beverage dispensing system within the housing, the beverage dispensing system comprising at least two mixing valves and interconnecting lines between said valves and a source of syrup and a water source, at least one of said mixing valves receiving syrup and carbonated water. The interconnecting lines between the mixing valves and the syrup source and water source are in heat exchange relationship with the ice bin.

Another aspect of the invention is a method of producing and dispensing a beverage. The method comprises producing ice with a refrigeration system having an evaporator remote from a compressor and a condenser, wherein the evaporator is housed inside a beverage dispenser housing. The method also comprises harvesting the ice into an ice bin, and cooling water and syrup by exchanging heat with said ice and carbonating said water. The method also includes conveying said carbonated water and syrup to a mixing and dispensing valve, mixing cooled carbonated water and syrup to form a beverage; and dispensing the beverage.

Yet another aspect of the invention is a method for producing and dispensing ice. The method comprises producing ice with a refrigeration system having an evaporator remote from a compressor and a condenser. The method then includes harvesting the ice into a bin wherein the ice is harvested using refrigerant drawn from a receiver containing liquid refrigerant, and dispensing the ice.

Another aspect of the invention is a beverage dispenser with an integral ice maker. The beverage dispenser comprises a water system including at least one pump, at least one ice-forming mold, and interconnecting lines therefore. The dispenser also comprises a refrigeration system having least one evaporator in heat exchange relationship with the ice forming mold, at least one receiver having an inlet connected to the condenser a liquid outlet connected to an expansion device, and a vapor outlet connected to the at least one evaporator by a valved passageway, and wherein a compressor draws refrigerant from the at least one evaporator and supplies compressed refrigerant to the condenser, the compressor and the condenser both being remotely located from the evaporator. The dispenser also comprises an ice bin for receiving ice made by the water system and the refrigeration system, at least one mixing valve for mixing and dispensing carbonated water and syrup, the carbonated water and syrup chilled by ice from the ice bin, and a housing, wherein the housing contains the water system, the at least one evaporator, the ice bin, and the at least one mixing valve.

The use of a single machine to make ice and dispense soft drinks has many advantages. Employees need not climb on ladders to replenish ice during peak demand periods. Floor space requirements are kept to a minimum in a business where floor space is at a definite premium, in that space is provided only for one machine rather than two. The space required by that single machine is small, because using the vapor defrost cycle allows placement of heavy, bulky, and noisy components to areas remote from the food service area. These and other advantages of the invention will be best understood in view of the attached description and drawings.

BRIEF DESCRIPTION OF THE FIGURES

FIG. 7 is a front perspective view of the ice maker portion of the apparatus of FIG. 1.

FIG. 8 is a rear perspective view of the ice maker portion of FIG. 7.

FIG. 12 is a schematic diagram of an alternate beverage system used in a beverage dispenser according to the present invention.

FIG. 17 is a schematic diagram of the electrical system for the apparatus of FIG. 1.

DETAILED DESCRIPTION OF THE DRAWINGS AND PREFERRED EMBODIMENTS OF THE INVENTION

Figure 23:
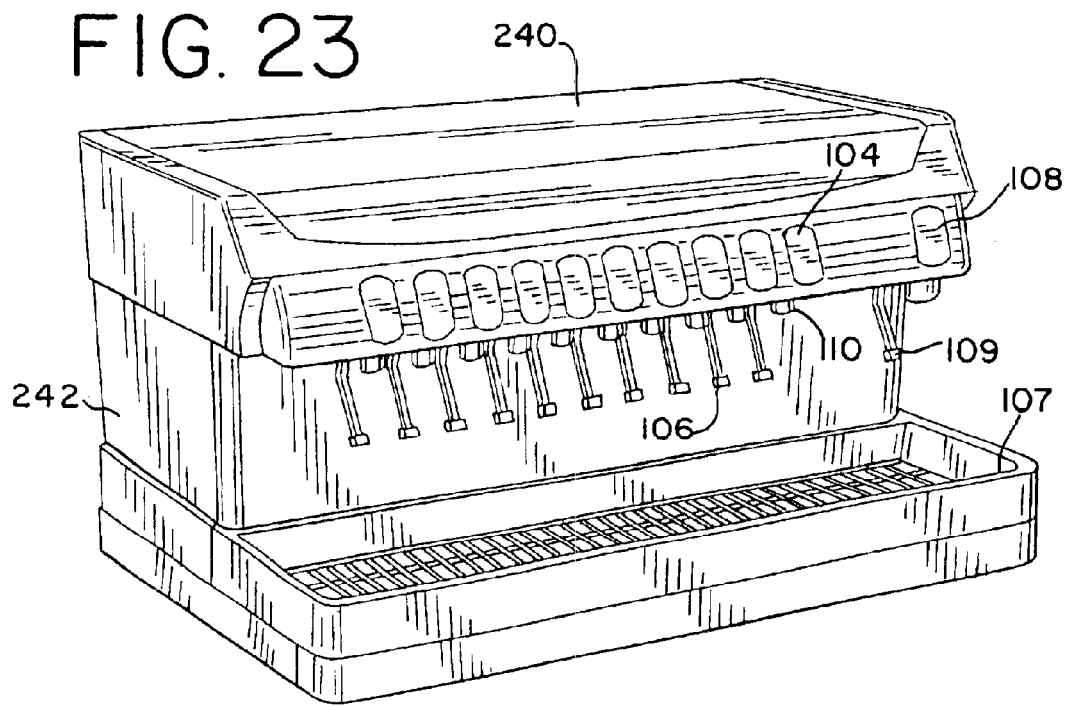
FIG. 23 is a perspective view of a beverage dispenser and ice making portion of a built-in embodiment of the invention.

A beverage dispenser with an integral ice maker is a beverage dispenser with ice-making components in the same housing with beverage making and dispensing components. The ice making components within the housing need not be a complete ice-making machine with all components, but at least those components that actually produce and harvest the ice are present within the beverage dispenser. However, of course, the complete apparatus of the beverage dispenser with an integral ice maker will include all of the necessary refrigeration system components. There are two presently preferred embodiments of the invention, a free-standing design depicted in FIG. 1, and a built-in design, part of which is shown in FIG. 23. The two embodiments are nearly identical, with the exception that the housing for the built-in embodiment takes into account that a countertop will separate the ice-storing and beverage-cooling portions from the beverage-dispensing portions of the apparatus. In both preferred embodiments, a portion of a refrigeration system to make ice is built into the ice and beverage dispensing portions of the apparatus and the ice storing and cooling portions are located "under the counter," that is, below the ice and beverage dispensing portions of the apparatus. Other portions of the refrigeration system are located remotely.

Figure 1:
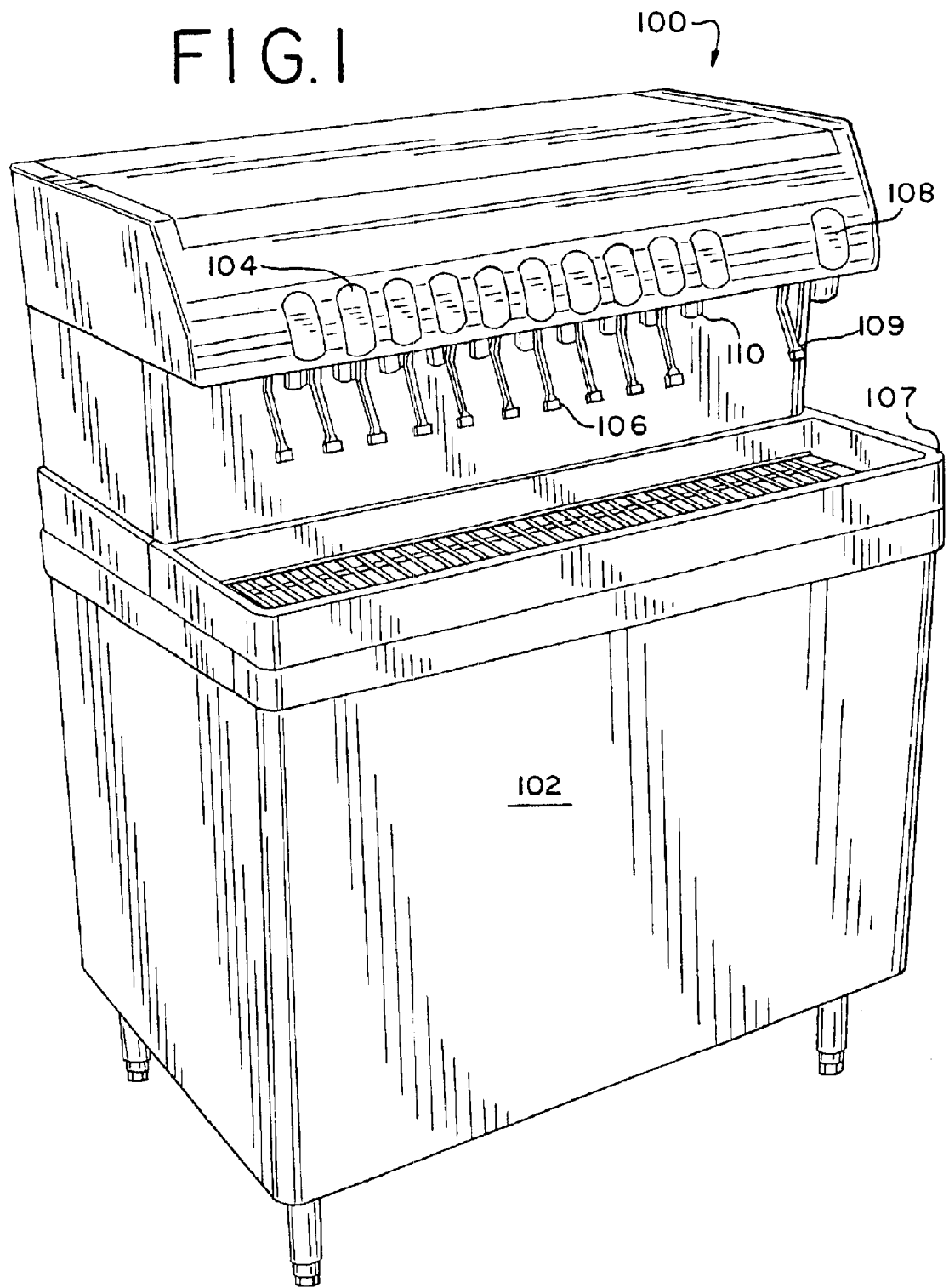
FIG. 1 is a perspective view of a free standing ice and beverage dispenser with an integral ice maker of the present invention.

FIG. 1 is a perspective view of a free standing ice and beverage dispenser with an integral ice maker 100 according to the present invention. The beverage dispenser 100 has a housing 102 and may have several valves 104 and nozzles 110 for mixing and dispensing soft drinks. Each valve may be actuated by a lever 106 above drip pan 107. The dispenser has an outlet 108 for dispensing ice into a cup of a user upon actuation by actuating lever 109. FIG. 1 depicts a freestanding machine, as it would appear in a serving or dining area of a fast-service restaurant or other dining facility.

Figure 2:
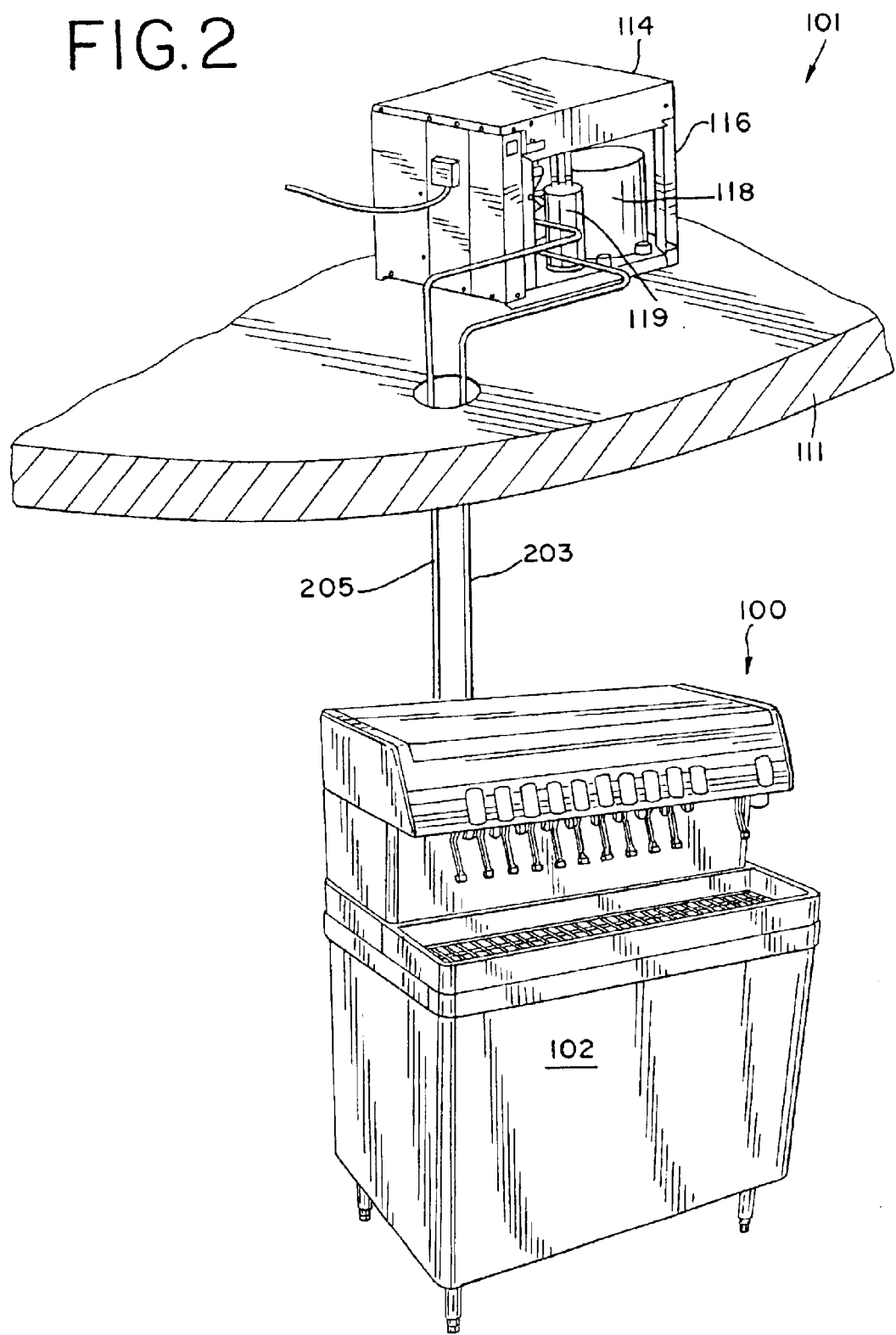
FIG. 2 is a perspective/elevational view of the free standing unit of FIG. 1 and a remote compressor and condenser.

FIG. 2 depicts the ice and beverage dispenser with an integral ice maker 100 inside a building, such as a dining or serving area of a fast-service restaurant, connected to the remote portion 101 of the refrigeration system. Inside the dispenser 100 is ice making machinery, including an evaporator and an ice making mold.

Remotely located, such as above roof 111, is a cabinet 114 housing the noisier, bulky portions of ice-making apparatus 101, including a condenser 116, a compressor 118 and an accumulator 119. Placing the bulky components in a remote location allows customers and employees of the restaurant easier access to the ice making and beverage dispensing machine. Refrigerant lines 203, 205 are preferably insulated to prevent heat transfer with the environment as the refrigerant traverses to and from the ice making equipment in dispenser 100. In addition, the components located remotely do not interfere with the operation, cleaning or maintenance of the beverage dispenser. A portion of the refrigeration system is remotely located if it is not in the immediate vicinity of the beverage dispenser. Besides locating portions of the refrigeration system on a roof, they may also be located in a back room, behind a wall separating a serving or dispensing area, or outside a building housing the serving or dispensing area.

Figure 3:
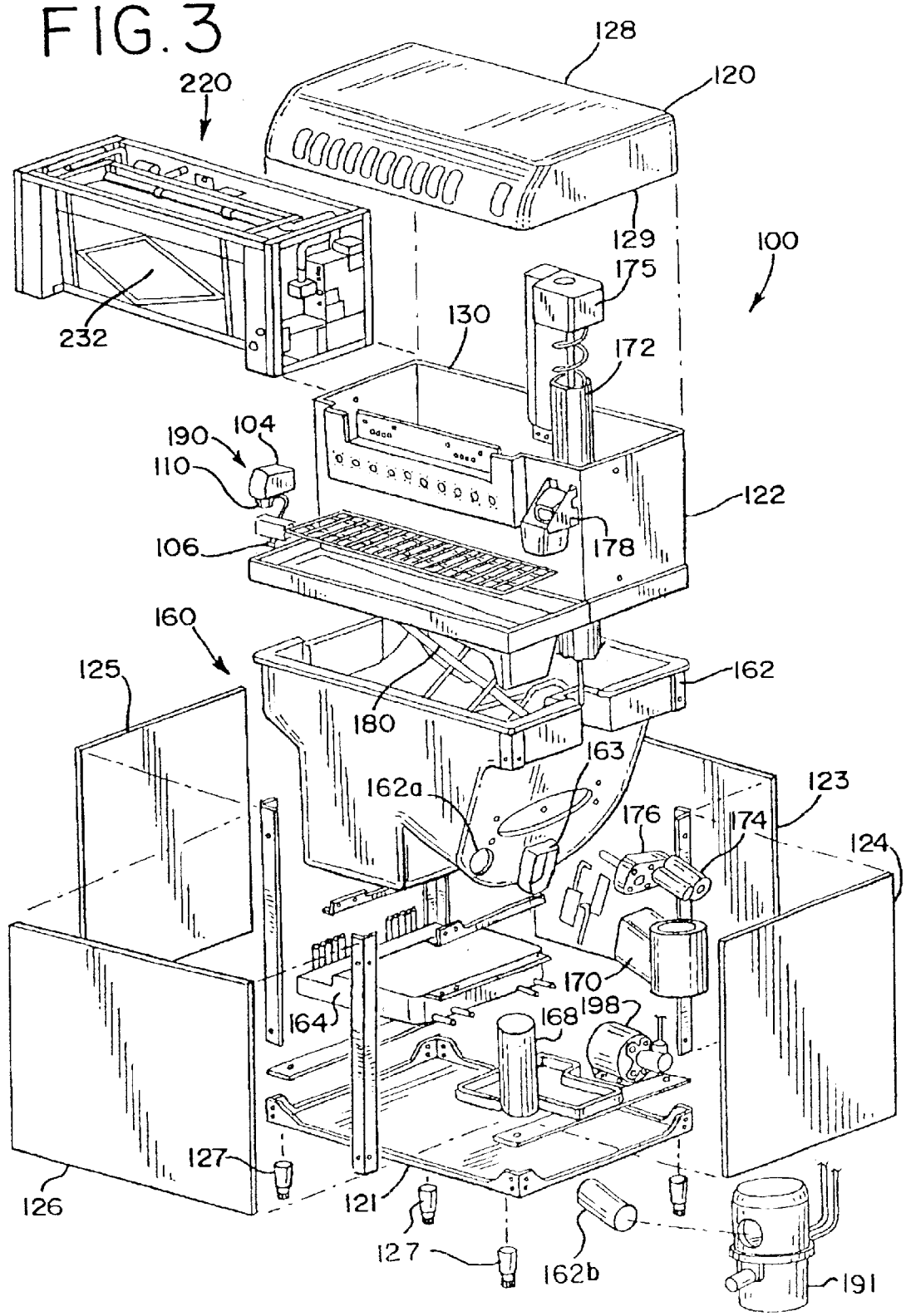
FIG. 3 is an exploded view of the free standing unit of FIG. 1.

FIG. 3 depicts an exploded view of the beverage dispenser with an integral ice maker 100. The dispenser includes functional portions for making ice 130, for storing ice and chilling syrup and carbonated water 160, and for dispensing a soft drink 190. After ice is made in the ice making portion 130, the ice drops into ice bin 162 with bottom cold plate 164. Ice bin 162 preferably has a flanged portion 163 for interfacing with an elevator to transport the ice within the dispenser. Ice bin 162 may also have an orifice 162a for discharging ice through a conveying tube 162b to an optional prechiller 191.

The beverage dispenser has a cold plate 164 made of aluminum cast around a number of stainless steel coils. The coils contain water, carbonated water from the carbonator 168 and soft drink syrup from a source of syrup, typically a bag-in-box (BIB) container (not shown). Ice in the ice bin keeps the cold plate cold and exchanges heat between the ice and the carbonated water and syrup, insuring that customers' drinks are dispensed cold. This portion of the dispenser also includes a flanged interface 170 for mounting to the ice bin flanged portion 163 and to elevator 172. A motor 174 with power transmission gearing 176 for changing the gearing ratio is used to stir the ice in ice bin 162 using agitator 180. Ice is dispensed on command through actuator lever 109 by a user through elevator 172 in the form of an auger in a tube and motor 175 (outer housing shown) to dispense ice through top adapter 178.

Figure 5:
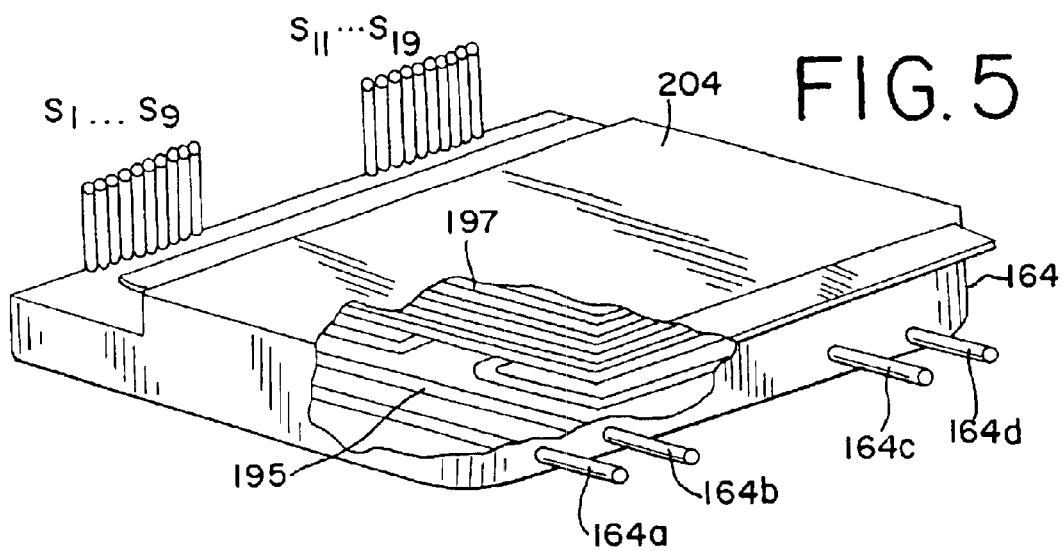
FIG. 5 is a partially broken away view of a cold plate heat exchanger used in the apparatus of FIG. 1.

Carbonated water is circulated by pump 198 to cold plate 164. The cold plate has numerous coils embedded within it, as shown in FIG. 5, for exchanging heat between the ice and the carbonated water and syrup used for beverages, including at least one coil for circulating carbonated water, and several coils for syrup. Carbon dioxide will dissolve more readily in cold water than in warm water, so cooling the carbonated water encourages more carbon dioxide to go into solution.

Another portion 190 of the dispenser 100 is for dispensing a soft drink. There is also sufficient pressure in the system to pump carbonated water to the upper portion for dispensing a soft drink through a valve block (not shown in FIG. 3) and a dispensing valve 104 and a nozzle 110 when actuated by a lever 106. In one embodiment, valve 104 may be a ratiometric valve that causes a set amount of beverage syrup to be dispensed whenever the carbonated water is dispensed. Typically, ratiometric valves dispense about 1 part of syrup for 5 parts of carbonated water.

The beverage dispenser with an integral ice maker may also include other parts, such as a top cover 120, bottom cover 121, upper portion housing 122, and sheet metal portions for the lower portion of the dispenser. These sheet metal portions may include back panel 123, side panels 124, 125, and front cover panel 126. In the built-in embodiment of the invention, depicted in FIG. 23, the sheet metal panels are omitted. The upper housing portion 122 may be a single housing as shown, or may comprise more than one component, such as a stainless steel top portion 128 and at least one plastic panel 129. The dispenser may also have legs 127.

Figure 4:
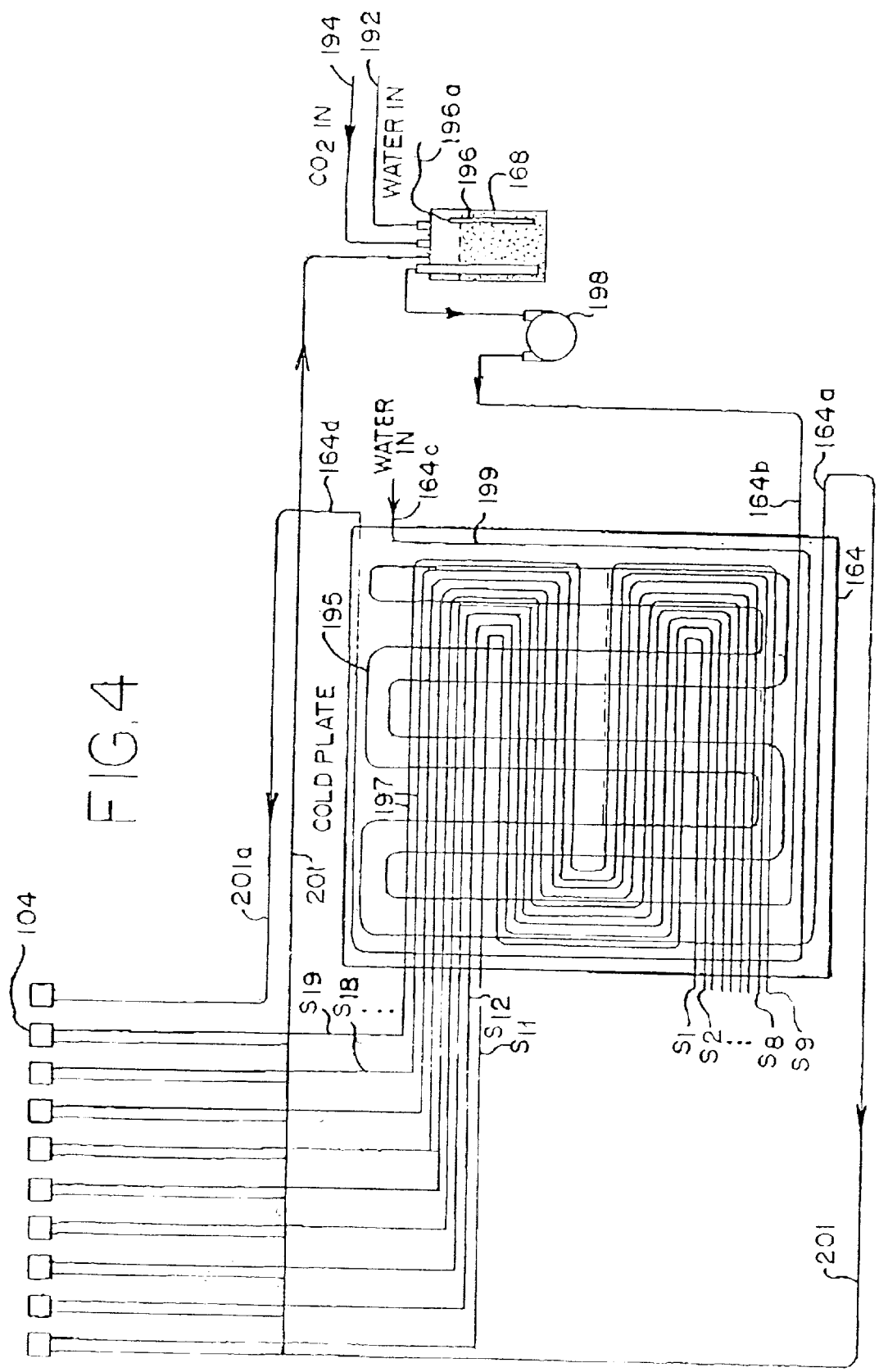
FIG. 4 is a schematic diagram of the beverage system of the apparatus of FIG. 1.

The cold plate 164 and its function are further detailed in FIGS. 4 and 5. FIG. 4 depicts cold plate 164 as part of a cooling circuit. The cold plate sits at the bottom of ice bin 162 in intimate thermal contact with ice (not shown). The cold plate is made of cast aluminum with stainless steel coils 195, 197, 199 embedded in the aluminum. These coils are preferably in a serpentine shape. Coil 195 circulates carbonated water from carbonator 168 via carbonator pump 198. Carbonator 168 has connections to sources of carbon dioxide and water. The carbonated water is made by adding water from water source 192 and carbon dioxide from carbon dioxide source 194. Mixed in the carbonator, the carbonated water then circulates to the cold plate 164 through inlet 164b through coil 195 and out through outlet 164a to line 201 and then to the beverage valves 104, carbonated water not used returning to the carbonator 168 for recycling. Carbonated water is cooled in this process, thus enhancing its ability to dissolve even greater amounts of carbon dioxide. Carbonated water is not needed at a particular valve if, for instance, lemonade or other non-carbonated beverage is being dispensed. Carbonator 168 may be equipped with a level sensor 196 connected by wiring 196a to a control system for the carbonator, as discussed below. Recirculating the carbonated water enables the carbonator tank to serve as a reservoir of chilled, carbonated water ready for dispensing to consumers. This reservoir may allow a manufacturer to reduce the amount of cooling needed from the cold plate, thereby allowing a smaller, more cost effective cold plate.

Additional coils 197 are also embedded in the cold plate, connected to sources $S_1$, $S_2$ . . . $S_8$, $S_9$ of soft drink syrup. The syrup is cooled by contact with the cold plate 164. After leaving the cold plate, the syrup is transported to soft drink valves 104 by syrup lines $S_{11}$ through $S_{19}$. Other embodiments may use fewer or more types of beverages, such as six different soft drinks or ten different soft drinks. The beverage dispenser may also dispense cold water only, if a separate line is provided for the water. FIG. 4 depicts inlet 164c as having a source of tap water leading to cooling coil 199 within the heat exchanger, and exiting from outlet 164d to cold water line 201a and then to a valve 104. Other embodiments may not use a separate cooling coil and dispensing line for water.

FIG. 5 is a partially broken away view of a cold plate heat exchanger 164, depicting a portion with a cast aluminum body 204, and with coils 195, 197 exposed. In this embodiment, coil 195 has an inlet 164b and an outlet 164a. Coils 197 have inlet lines $S_1$ to $S_9$ from containers of syrup and outlet lines $S_{11}$ to $S_{19}$ to the mixing and dispensing valves 104. As noted in FIG. 4, inlet 164c to coil 199 (see FIG. 4) and outlet 164d may be used to cool plain water for separate dispensing. Aluminum is used because of its excellent thermal conductivity and heat transfer characteristics. While aluminum is not essential, it is more convenient and economical than other materials which could be used, such as brass, bronze, gold or silver. The tubing is stainless steel, compliant with U.S. Food and Drug Administration regulations for food-handling devices. By keeping plenty of ice in the ice bin and on the cold plate, and by keeping the carbonated water and syrup lines short, a soft drink may be dispensed at a temperature as low as 38° F. A soft drink drawn after a random or irregular period is known as a casual drink; thus, a casual drink may be dispensed in a beverage dispenser embodiment of the present invention at a temperature of as low as 38° F.

Figure 6:
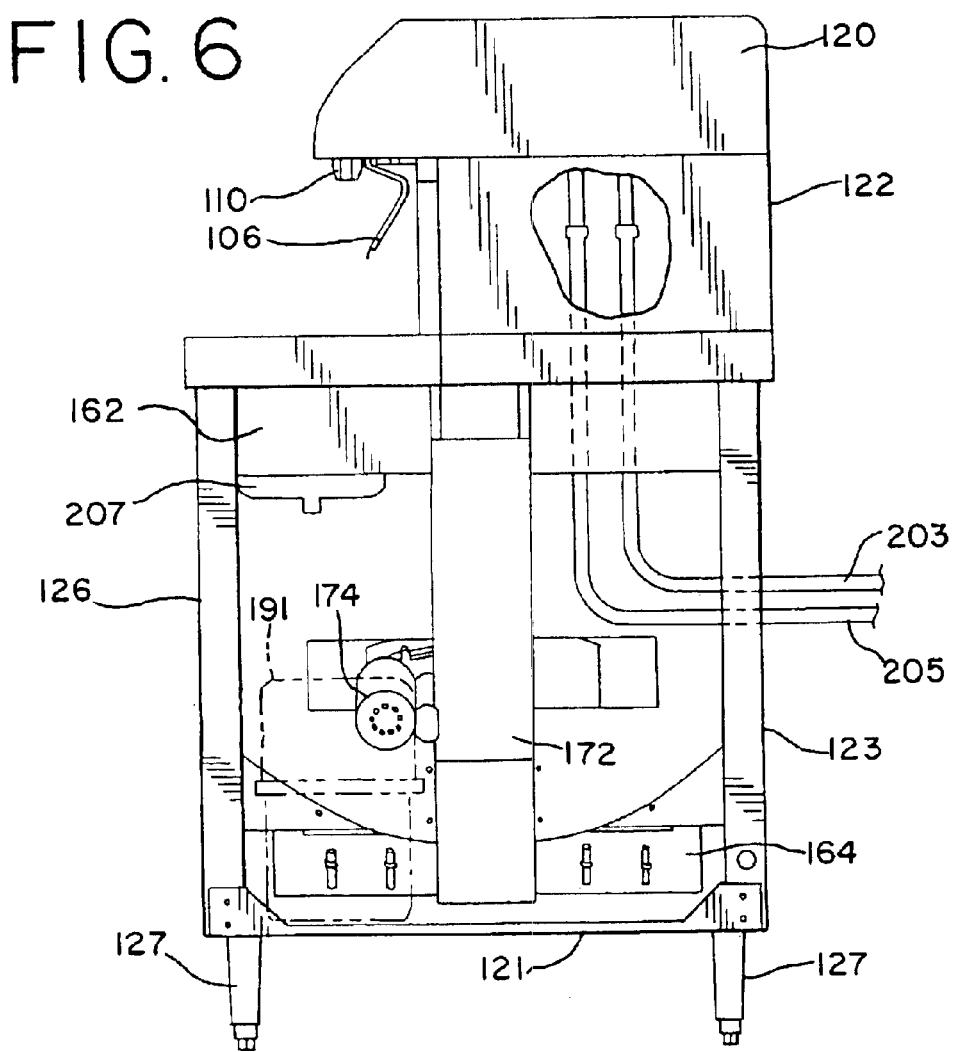
FIG. 6 is a partially broken away side elevational view of the apparatus of FIG. 1.

FIG. 6 is a partially broken away side elevational view of the embodiment of FIG. 1. Visible is top cover 120, actuating lever 106 and nozzle 110 for dispensing a soft drink. Back panel 123 and front panel 126 may be seen, along with bottom panel 121 and legs 127. Upper housing 122 is partially broken away and right side panel 124 has been removed. Drain pan 207 may be viewed, as may ice bin 162, elevator 172 and motor 174, and cold plate 164. Incoming liquid refrigerant line 203 and exiting refrigerant line 205 may also be seen. Also visible (in dotted line) is an optional prechiller 191.

FIG. 7 is a perspective view, taken from the right front of the beverage dispenser with an integral ice maker 100, of an ice making apparatus 220 that fits into ice-making area 130 in FIG. 3. The ice making apparatus includes inlet liquid refrigerant line 203 from the remotely-mounted portion 101 of the ice making machinery, and return vaporous refrigerant line 205. Liquid refrigerant line 203 leads to one or more receivers for holding the refrigerant, not visible in FIG. 7. From the receivers, liquid refrigerant leaves via line 209 to receiver service valve 211 and to evaporator 234. Other plumbing features in the liquid refrigerant line are not visible in FIG. 7. Other components of the ice making equipment that are visible in FIG. 7 include control box 222, water line 224 for routing water to water distributor 226 and ice-making mold 228. Ice thickness sensor 221 lets the ice-making controller know when to stop making ice and to begin a harvest cycle. Splash guard 232 helps to contain water from the fractional-freezing ice making process used in this equipment. The entire unit 220 fits into the space 130 depicted in FIG. 3.

This unit is available from Manitowoc Ice Co., Inc., Manitowoc Wis., as a model SU1024 YC ice machine. The dimensions of the model are approximately 42" across, about 12" deep, and about 19" high. The portions of the machine 220 that deal with water and ice are in the front areas depicted in FIG. 7, while the evaporator is toward the middle of the machine, and the areas that contain most of the refrigerant lines and plumbing are to the rear of FIG. 7. With this design, the cooler areas are toward the front, and also toward the areas where ice and beverages are dispensed, while the warmer or plumbing areas tend to be toward the rear of the machine. With this configuration, beverages are more likely to be served cooler rather than warmer, in conformance with customer expectations.

FIG. 8 is a perspective view of the same ice making machine 220 from a left rear view, with more of the components visible. Liquid refrigerant from remote compressing and condensing unit 101 are received through liquid refrigerant line 203 to one or more receivers 229a. A second receiver 229b is not visible in this view. The receivers are configured for use in an ice-making cycle and in a harvesting cycle. In an ice-making cycle, liquid refrigerant moves from one or more receivers 229a through liquid refrigerant line 233 through receiver service valve 211 to filter/drier 217 and to liquid solenoid 219. In one embodiment, the liquid refrigerant leaves the liquid solenoid and passes through the outer portion of a tube-in-tube heat exchanger (not shown), where liquid refrigerant may exchange heat with exhaust gas from the evaporator on its way back to the remote compressing and condensing unit 101.

The liquid refrigerant then leaves either the liquid solenoid valve 219 or the heat exchanger to arrive at thermal expansion valve 225 and then to evaporator 234. Inside the evaporator, the refrigerator expands from a liquid to a gas and absorbs its heat of vaporization, thus cooling the evaporator. Since the evaporator is in a thermal exchange relationship with the ice-forming mold 228, water in the ice-forming mold freezes and makes ice in a fractional-freezing process. The water which does not freeze in a first pass through the ice making mold may be recycled by water pump 230 through the water distributor 226 and thence back to the ice making mold 228. Make up water is supplied through water float valve 231.

Other components of the ice-making machinery are also visible in FIG. 8. The liquid refrigerant line 203 may actually connect through a high-side valve 213, while the return refrigerant line 205 may connect through low-side valve 215. These valves would typically be used only upon hook-up and installation (or removal) of the ice making unit. A capillary and temperature-sensing bulb 237 or temperature sensor to control the thermal expansion valve 225 may not be visible in FIGS. 7 and 8 because of insulation obscuring the line of sight, but are shown, along with other components of the refrigeration system, in FIG. 9. Check valve 241 may desirably be placed in the refrigeration line 203 to receiver 229a to prevent backflow of liquid or gas in the line. During the harvest cycle, vapor from the receivers 229a, 229b flows in line 233 to harvest solenoid valve 227 and through line 235 to the evaporator 234. Control box 222 contains the controls necessary to operate the ice making machinery.

Using vapor from the receiver enables a user to harvest ice and save energy. Ice molds typically release ice by heating the evaporator and partially melting the ice, or by actual resistance heating of a grid of wires coextensive with the ice-forming mold. Resistance heating clearly consumes a large amount of energy. If it is possible to release the ice in another manner, energy can be saved. Therefore, many evaporators use hot gas from the compressor. This saves the trouble of installing an electrical heating grid, but may require a compressor to be located near the evaporator and thus near the ice-harvesting equipment. Vapor defrosting, described in the referenced patent applications assigned to the assignee of the present invention, allows the heat of condensation of the refrigerant to be used to warm and release the ice, but does not require the compressors to be located close by. The ingenious design of the receivers and a head pressure control valve insure enough heat will be available for harvesting ice under virtually all operating conditions.

Vapor defrosting is further described in U.S. Pat. No. 6,196,007, assigned to the assignee of the present invention, and is incorporated herein by reference. Other information that may be useful in understanding the present invention is contained in U.S. Pat. application Ser. No. 09/910,437, filed Jul. 19, 2001; U.S. Pat. application Ser. No. 09/833,794, filed Apr. 11, 2001; and U.S. Provisional Appl. No. 60/197,535, filed Apr. 14, 2000, all of which are incorporated by reference.

Figure 9:
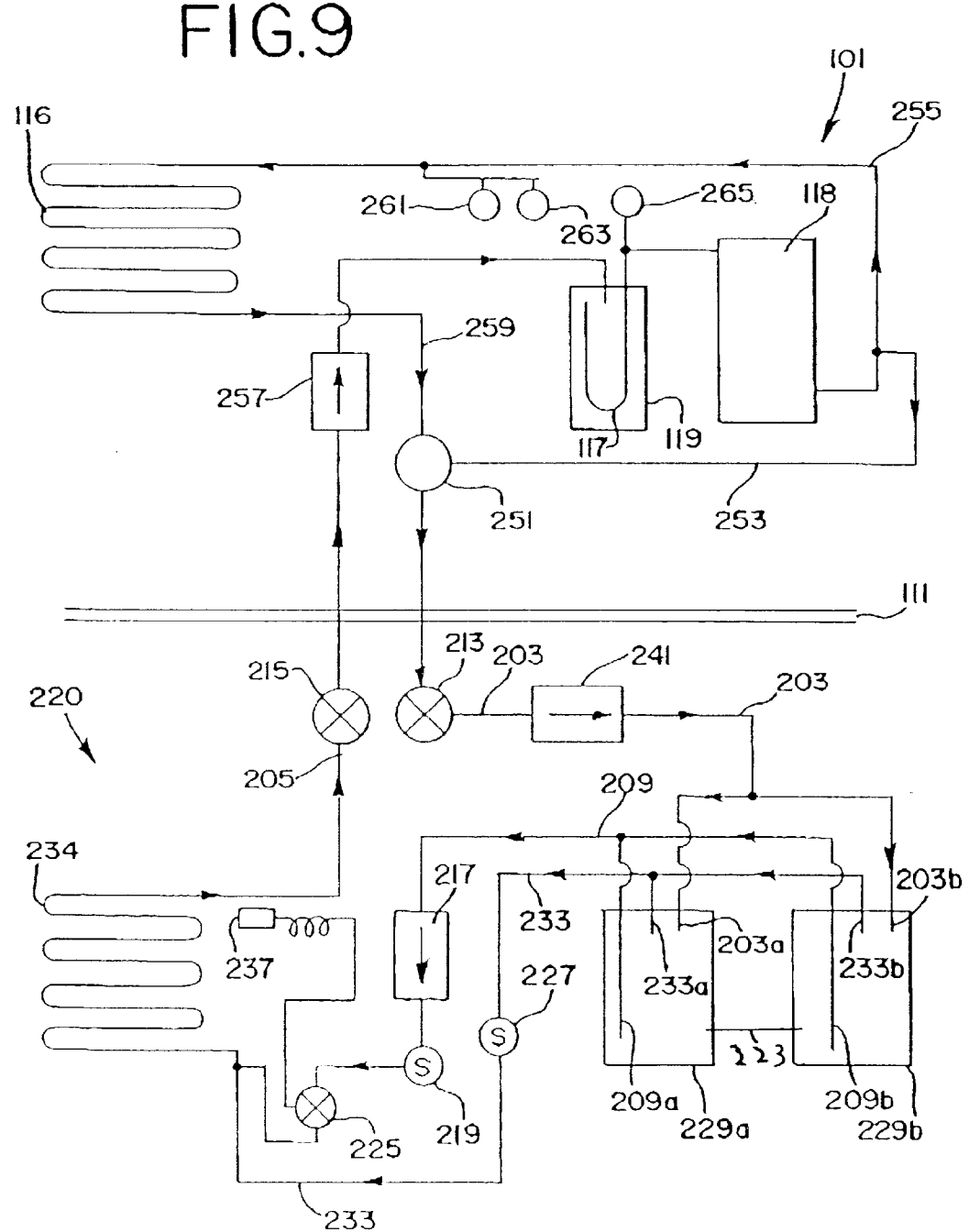
FIG. 9 is a schematic diagram of the refrigeration system for the apparatus of FIG. 2.

FIG. 9 contains a schematic drawing of the local 220 and remote 101 portions of the ice making machinery. As mentioned above, the local portion 220 of the ice making machinery includes a liquid refrigerant line 203 from the remote unit 101. The liquid refrigerant line may include a manual high side valve 213 for installation and removal, and the return line 205 for returning refrigerant to the remote portion may also have a manual low side valve 215. The incoming refrigerant line may have a check valve 241 to insure one-way flow of refrigerant from the compressor 118 or condenser 116 units. Liquid refrigerant enters receivers 229a, 229b through inlet lines 203a, 203b. Other embodiments may have only one receiver, still other embodiments may have more than two receivers. If there are two or more receivers, each receiver is connected to at least one other receiver with piping or tubing 223. The refrigerant enters the receivers and is stored in a partially gaseous state and partially liquefied state. The receivers should be designed such that the exit pipes 209a, 209b, permit only liquid to pass under all operating conditions and temperatures. In an ice-making mode, the refrigerant leaves the receivers 229a, 229b in a liquid state and passes through line 209 and also though a filter drier 217 on the way to solenoid valve 219 and thermal expansion valve 225. The thermal expansion valve controls the rate at which liquid is expanded into a gas, depending on the desired temperature of the evaporator. The temperature may be measured at a temperature sensing device 237, such as a thermistor or a capillary bulb.

During a harvest mode using vapor defrosting of the evaporator, thermal expansion valve 225 is closed and harvest valve 227 is used to control the harvesting of the ice from the ice mold 228 (see FIG. 7). Vaporous refrigerant leaves receivers 229a, 229b through exit pipes 233a, 233b, into line 233 to harvest valve 227. The vaporous refrigerant is warm enough to warm the evaporator and partially melt the ice formed on the ice mold so that it falls into the ice bin 162. Receivers 229a, 229b should be designed such that only vaporous refrigerant leaves the receivers through exit pipes 233a, 233b under all operating conditions and temperatures. After the refrigerant leaves the evaporator 234, it must travel back to the remote portion for compressing, condensing, and reusing via return line 205. Lines 203 and 205 may be in heat exchange relationship with each other, with the incoming liquid refrigerant (hot) transferring heat to the cooler gaseous refrigerant through a tube-in-tube heat exchanger (not shown).

Vaporous refrigerant enters remote section 101 through accumulator 119, return line 205 and check valve 257. Check valve 257 prevents backward flow of gaseous refrigerant and permits only one-way flow to the accumulator. The accumulator may have a J-tube 117 to allow gaseous refrigerant to flow to compressor 118 and prevent liquid refrigerant from entering the compressor. Hot compressed gas then flows through pipe 255 to condenser 116 for condensing to a liquid. A fan (not shown) may be used to help cool and condense the gas into a liquid refrigerant, rejecting heat to the environment. The remote portion 101 may be under the control of a fan cycling control 261 to control the amount or rate of air to the condenser. A high pressure cutout 263 may be placed on the discharge side of compressor 118, and a low pressure cutout 265 on the suction side of the compressor to protect the compressor and the associated equipment and circuitry. The head pressure control valve 251 regulates the amount of liquid refrigerant sent to the local portion 220. Bypass line 253 also leads to the head pressure control valve 251. The head pressure control valve may desirably be a Head Master brand valve.

Liquid refrigerant from the head pressure control valve then returns to the ice-making section 220 and the process of refrigeration is repeated. Under normal circumstances, there is sufficient vapor flow to accomplish defrosting of the evaporator and release of ice. During a freeze cycle of an ice machine, the vapor remains trapped in the receivers 229a, 229b. However, when the system is used during a harvest mode of an ice making cycle, harvest valve 227 is opened. The passageway between the receivers 229a, 229b, through vapor outlet 233a, 233b and refrigerant line 233 to the evaporator 234, is thus opened, and the vapor outlet is connected by the valved passageway directly to the evaporator. Vapor, taken off the top of the receivers 229a, 229b, is then passed through the evaporator, where some of it condenses. The heat of condensation given off as the refrigerant is converted to a liquid from a vapor is used to heat the evaporator 234. This results in ice being released from the evaporator in an ice machine.

The amount of vapor in the receiver at the beginning of a harvest cycle may be insufficient to warm the evaporator to a point where the ice is released. However, as vapor is removed from the receiver, some of the refrigerant in the receiver vaporizes, until the receiver gets too cold to vaporize more refrigerant. This also results in a lower pressure on the outlet, or high side, of the compressor. When the pressure on the high side of the compressor falls below a desired point, the head pressure control valve 251 opens and hot gas from the compressor is fed to the receivers 229a, 229b through the bypass line 253 and liquid line 203. This hot vapor serves two functions. First, it helps heat the liquid in the receiver tanks 229a, 229b to aid in its vaporization. Second, it serves as a source of vapor that mixes with the cold vapor to help defrost the evaporator. However, the vapor that is used to defrost the evaporator is much cooler than the hot gas directly from the compressor in a conventional hot gas defrosting system.

Figure 10:
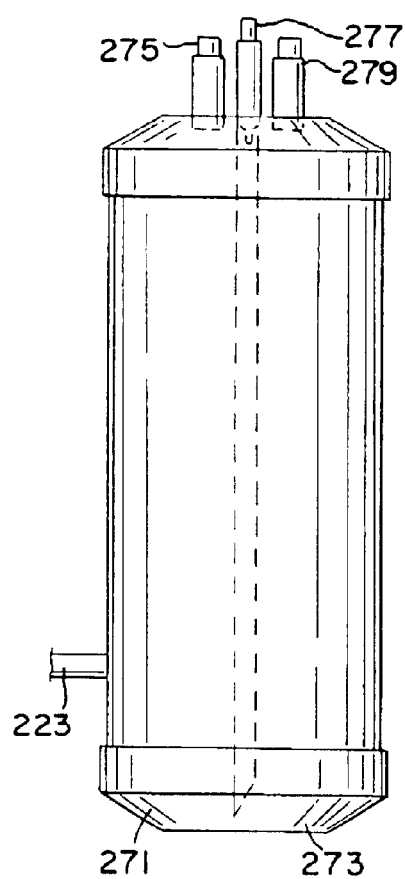
FIG. 10 is an elevational view of a first embodiment of a receiver used in the apparatus of FIG. 1.
Figure 11:
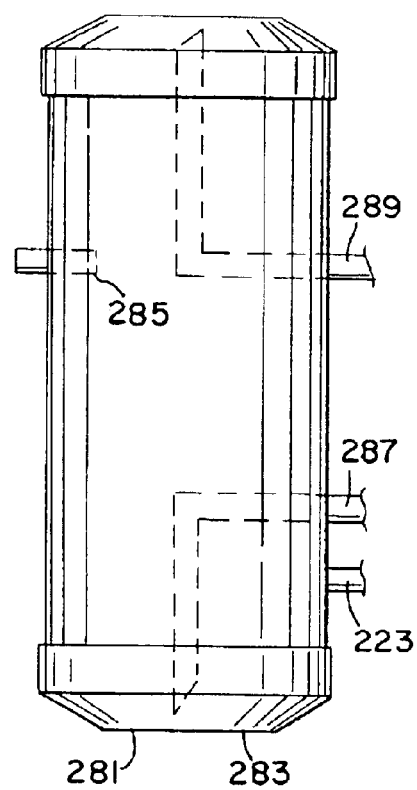
FIG. 11 is an elevational view of an alternate embodiment of a receiver that could be used in the apparatus of FIG. 1.

FIG. 10 features a first receiver 271, having an outer housing 273, and three pipes, 275, 277, 279. Inlet pipe 275 need not extend far into the receiver, simply far enough to avoid leakage from the receiver. Liquid outlet pipe 277 should be placed with its inlet low in the receiver so that only liquid flows from the receiver through outlet pipe 277 to the receiver service valve (if present) or to a filter/drier (if present) and ultimately the liquid solenoid valve and thermal expansion valve. Gaseous outlet pipe 279 is desirably placed with its inlet high on the receiver, so that only gas flows from the receiver to the harvest solenoid valve. If there is more than one receiver in the ice making apparatus, they should be connected by tubing or piping 223. The design of the receivers is easily variable by changing the diameter and height of the receiver housings. FIG. 11 features an alternate receiver design 281, again with a housing 283 and three pipes 285, 287, 289. Inlet pipe 285 is now placed about midway to slightly higher in the receiver, the inlet pipe extending far enough into the receiver to prevent leakage. The liquid outlet pipe 287 is placed in the lower half of the receiver housing 283, but the inlet to pipe 287 is very near the bottom of the receiver, so that only liquid will flow from liquid outlet 287. Gaseous outlet pipe 289 is placed in the upper half of the housing, but the inlet to pipe 289 is very high in the receiver, so that the receiver would virtually have to be filled with liquid refrigerant in order for gas not to be the effluent from outlet 289. In instances where the ice making machinery has more than one receiver, each receiver should be connected to the others through piping or tubing 223.

FIG. 12 is similar to FIG. 4 but shows additional equipment useful in an ice making and beverage dispensing machine. This embodiment has a water input 192 regulated by a water pressure regulator 193. A first tee 181 routes water to water supply line 182 to the ice making equipment. The other outlet of tee 181 flows water to second tee 184. There, water may be routed from one outlet of tee 184 as non-carbonated water to the cold plate 161. This water travels to cold plate inlet 161a and coil 212 for chilling, then out through outlet 161 e through piping 167 to a connection to water selection manifolds 187, where this chilled non-carbonated water is available to users. The water selection manifolds will be explained below.

Water also travels through the other outlet of tee 184 to a carbonator pump 198 and carbonator 168, which is also supplied with a source of carbon dioxide 194. Cold plate 161 may receive carbonated water from carbonator 168 through inlet 161b, out through outlet 161c and back in through inlet 161d, all the while traveling through stainless steel coils 210, 214, out through outlet 161f and through tubing or piping 169 to a connection to water selection manifolds 187. The syrup for carbonated beverages travels from a source of syrup, such as bag-in-box containers (not shown) through syrup inlets $S_1$–$S_{10}$, through syrup coils embedded in the cold plate heat exchanger, out through outlets $S_{11}$ through $S_{20}$. The syrup then travels to block valves 183 which receive water or carbonated water from water selection manifolds 187. The water and syrup are then routed to mixing and dispensing valves 104 (see FIG. 1) of the beverage dispenser.

Figure 13:
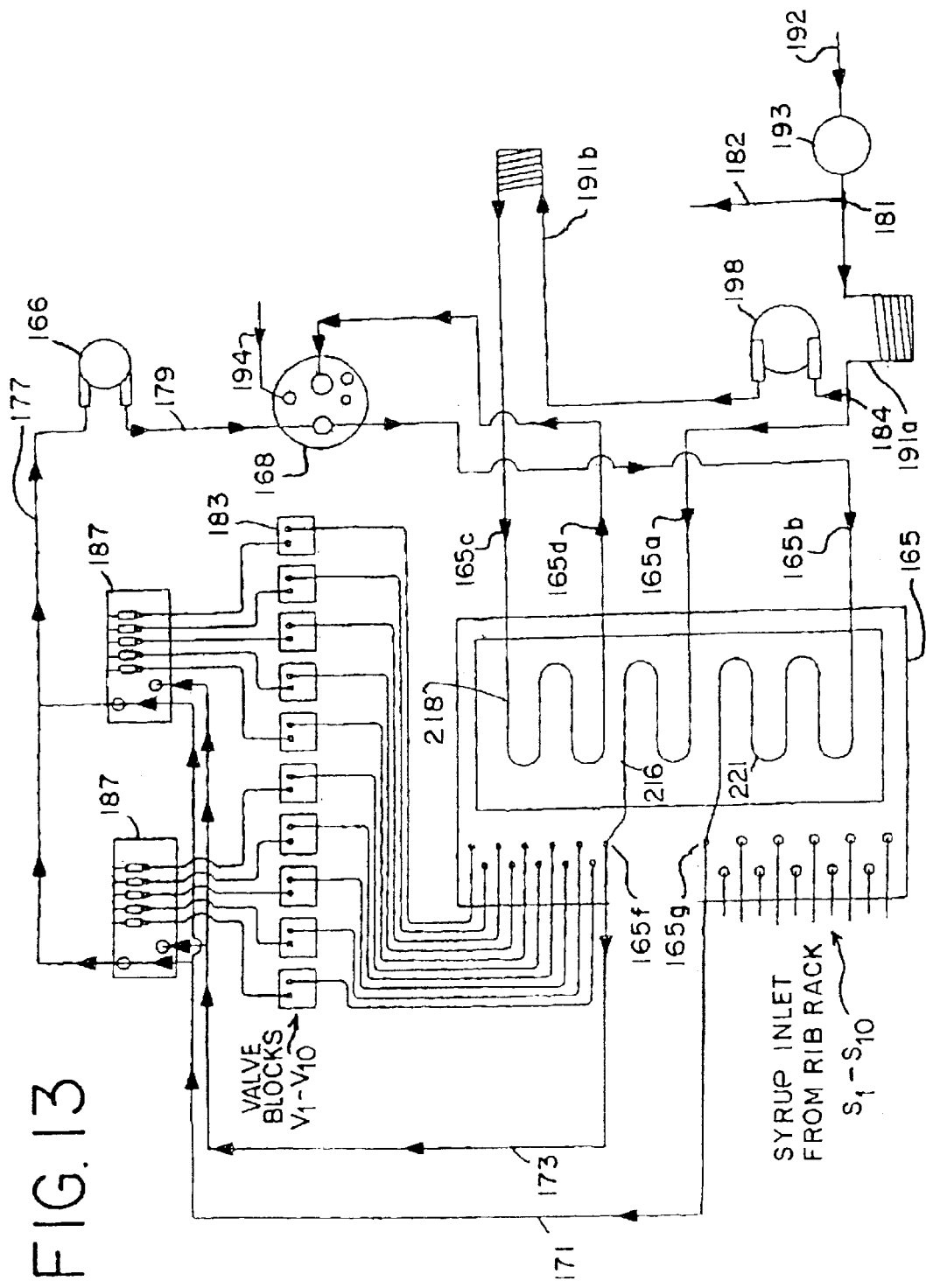
FIG. 13 is a schematic diagram of another alternate embodiment of a beverage system useful in embodiments of the present invention.

FIG. 13 shows another embodiment of a beverage system similar to those shown in FIGS. 4 and 12, but using a different cold plate heat exchanger 165 and allied equipment. The principal difference in this embodiment is the recycling of the carbonated water to the carbonator for added chilling and more dissolved carbon dioxide as a result. There may also be a pre-chiller for additional chilling of the incoming water in its initial routing to the carbonator tank. This embodiment has a water input 192 regulated by a water pressure regulator 193 with a tee 181 and water supply line 182 to the ice making equipment. The water then flows to a second tee 184, and is routed for non-carbonated water to the cold plate 165 through inlet 165a and coil 216 for chilling, then out through outlet 165f through piping 173 to water selection manifolds 187, where this chilled non-carbonated water is available to users.

Figure 22:
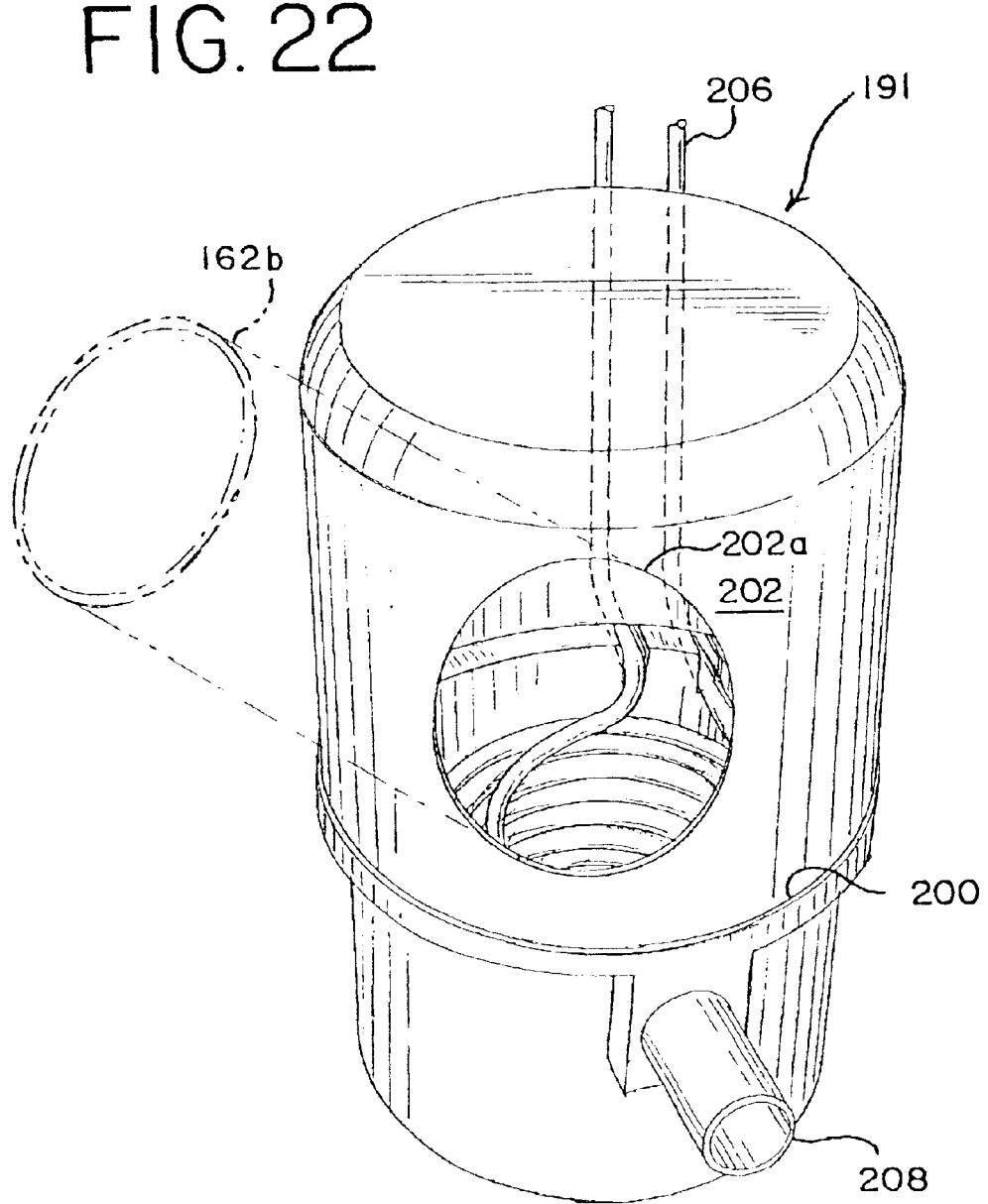
FIG. 22 is a perspective view of a prechiller used in the apparatus of FIG. 1.

The other outlet of tee 184 is routed to a carbonator pump 198 and carbonator 168, which is also supplied with a source of carbon dioxide 194. The water routed to carbonator 168 may be chilled en route to the carbonator. The water is routed through coils embedded in the cold plate, and there may also be a prechiller, in at least one location, to chill the incoming water from ice from the ice bin. The prechiller, as shown in FIG. 13, may be in either of two locations, prechiller 191a, chilling incoming water, or prechiller 191b, chilling water to the carbonator. More details on the prechiller are shown in FIG. 22. If the prechiller is not used in a particular location, the piping lines that would be in and out of the prechiller are directly connected to one another.

The water to the carbonator may also receive additional chilling from cold plate 165, the water traveling in through outlet 165c, through stainless steel coil 218, back out through inlet 165d, enroute to carbonator tank 168. The cold plate also chills carbonated water from carbonator 168 en route to the dispensing nozzles through inlet 165b, through embedded coil 221, out through outlet 165g and through tubing or piping 171 to water selection manifolds 187. This embodiment has a recycle line 177 for recycling the carbonated water back to the carbonator for extra chilling. This embodiment also has a recirculation pump 166 for pumping the carbonated water through line 179 to carbonator 168. The syrup for carbonated beverages travels from a source of syrup, such as bag-in-box containers (not shown) through syrup inlets $S_1$–$S_{10}$, through syrup coils embedded in the cold plate heat exchanger, out through outlets to valve blocks $V_1$ through $V_{10}$. As in the other embodiments, the syrup then travels to block valves 183 which receive water or carbonated water from water selection manifolds 187. The water and syrup are then routed to mixing and dispensing valves 104 (see FIG. 1) of the beverage dispenser.

FIG. 22 is a prechiller useful in embodiments of the beverage dispenser of the present invention. The prechiller 191 includes a prechiller bottom housing 200 with a drain 208, a chilling coil 206 within bottom housing 200, and cover 202. The coil is preferably stainless steel, and is as long as possible, so that the greatest amount of incoming water, inside the coil, may remain in the chiller for the longest possible period. The incoming water enters one end of coil 206 and leaves via the other end. A preferred embodiment is about 50 feet long, and has nested coils 3 or 4 layers deep. The prechiller is positioned near ice bin 162 so that ice from conveying tube 162b enters prechiller housing 200 via an orifice 202a in prechiller cover 202. The ice and melted ice in bottom housing 200 are at a temperature much cooler than the incoming water, and thus the prechiller exchanges heat from the incoming water to the ice and melted ice. As more ice enters the prechiller, and more ice melts, the excess leaves via drain 208, and is routed outside the beverage dispenser. As shown in FIG. 13, prechiller 191 may be plumbed as desired in the machine, for example, to prechill all water entering the beverage dispenser, as in prechiller 191a, and thereafter routed to both "plain water" and for carbonated water supplies. The prechiller may also be plumbed as shown for prechiller 191b, to prechill only water routed to the carbonator. The prechiller itself may be located in the same location in the beverage dispenser, with plumbing changed as desired. The prechiller may also be plumbed to chill another line as desired, for instance, water to or from the recirculation pump 166 or carbonator tank 168.

Figure 14:
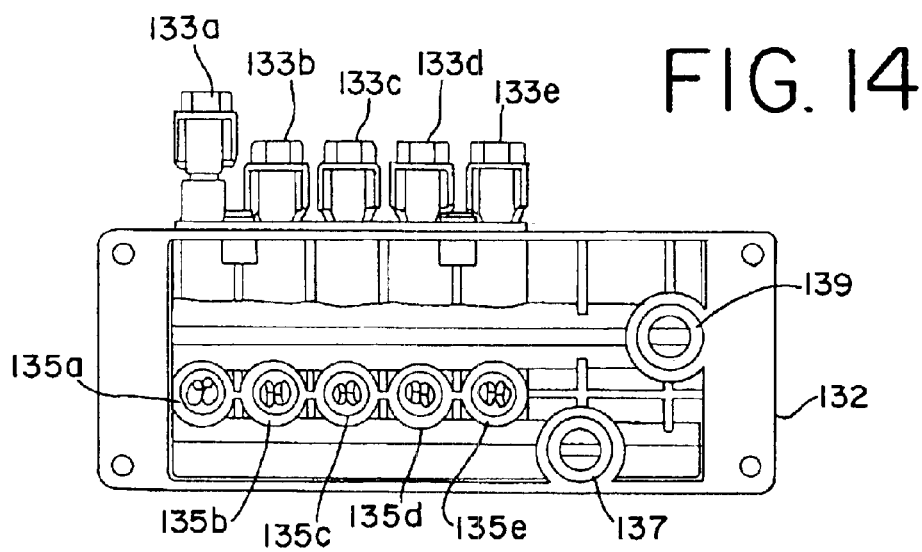
FIGS. 14–16 are details of a water selection manifold used in the apparatus of FIG. 1.

FIGS. 14, 15, 16a and 16b reveal the details of the water selection manifolds desirably used in the ice making and beverage dispensing machine. Water selection manifolds 187 in FIGS. 14 and 15 each have five cells, each cell having an inlet and an outlet, as well as two additional inlets, such as carbonated water and non-carbonated water. The water selection manifolds allow an operator to decide which dispensing valves of the dispenser have carbonated water rather than non-carbonated water by adjusting the shuttles within the water selection manifold. The chosen water then flows through the passageway to be combined with syrup in a mixing and dispensing valve. In FIG. 14, the water selection manifold body 132 contains two inlets, 137, 139, as well as outlets 135a–e, one for each of the five cells within the body. The outlets are connected to block valves downstream of the manifold. Inlet 137 is connected to a non-carbonated water line and inlet 139 is connected to a carbonated water line.

Figure 15:
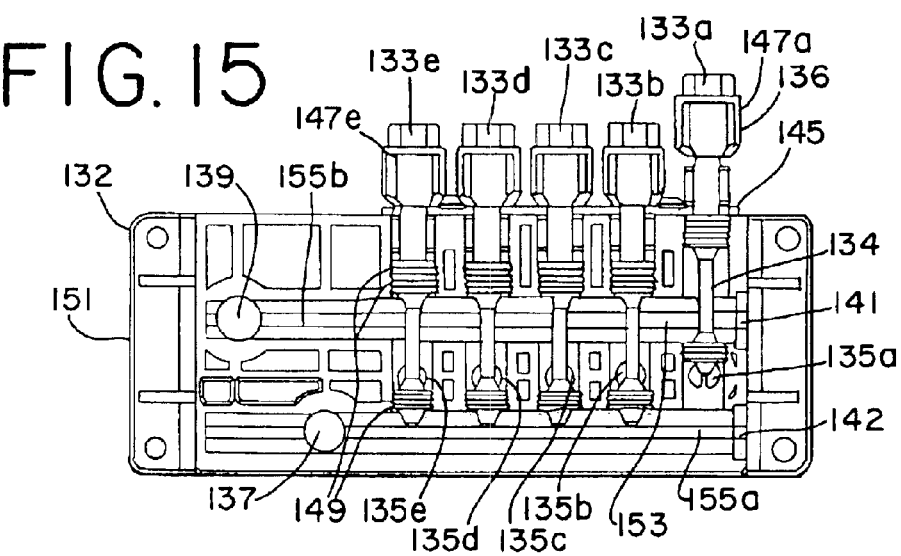
Figure 16A:
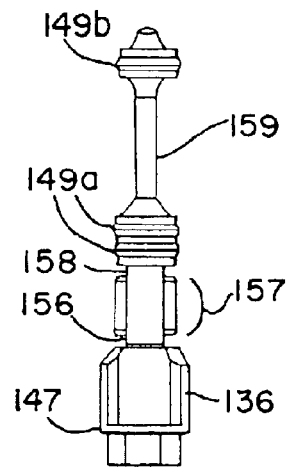
Figure 16B:
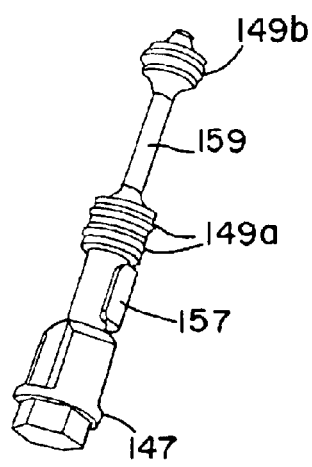

As shown in FIG. 15, the shuttle valve members 147 are each fitted with three O-rings 149. These O-rings allow the shuttle valve member 134 to seal off any flow from the cell in which it is housed from the bottom of the valve body. Also, depending on their position, the O-rings seal between the internal flow channels 155a, 155b and the outlets 135a–e.

For example, when shuttle valve member 147a is in the position shown in FIG. 15, non-carbonated water entering the valve body 132 through inlet 137 is allowed to travel through channel 155a and exit through outlet 135a. On the other hand, shuttle valve member 147e allows carbonated water entering the valve body 132 through inlet 139 to travel through channel 155b and exit through outlet 135e. In the positions shown, carbonated water will also leave the manifold through the corresponding outlets 135b, 135c and 135d. Also, carbonated water in channel 155b is prevented from exiting outlet 135a by shuttle valve member 147a, with the O-rings sealing inside the valve body 132.

To prevent the shuttle valve member 147a–e from being accidentally moved out of its desired position, either by an inadvertent force on the handle 136 of the shuttle valve member extending out of the valve body, or by differences in pressure between the two channels 155a and 155b, a locking plate 145 (FIG. 15) is preferably provided. The locking plate 145 cooperates with locking grooves 156 and 158 and a retaining boss 157 formed on the shuttle valve member 147 and best seen in FIGS. 16a and 16b. Locking groove 156 is used to lock the shuttle valve member in an "in" position, and locking groove 158 is used to lock the shuttle valve member 147 in an "out" position. The reduced diameter section 159 of the shuttle valve member allows for fluid to flow within the cell in which shuttle valve member 147 is placed. O-rings 149a provide a lower sliding seal and O-ring 149b provides an upper sliding seal.

FIGS. 17–21 depict the electrical system 300 for the beverage dispenser with an integral ice maker. FIG. 17 depicts the electrical components primarily used for the carbonation and ice-and-beverage dispensing portions, while FIGS. 18–21 focus on the ice-making portions, both local in the beverage dispensing apparatus 100, and in the remotely-located compressor/condenser unit 101. The electrical system for the dispenser 100 includes a power source 301, which may be single phase 120 VAC power. In other embodiments, three-phase power may be used, at least for the ice making components.

The electrical system includes a first circuit board 303 and a carbonator circuit board 305. Circuit board 303 mounts mounting hardware or plugs 307 and a microprocessor controller 309 for controlling the soft drink dispenser with an integral ice maker. The electrical system controls power to the soda valves 104 and to the coils of agitator motor 174 and elevator motor 175. The microprocessor controller interfaces with safety switches and interlocks 317, 319 on the dispenser. Interlocks may guard against removal of sheet metal panels 123–126 by interrupting power if the panels are removed. Interlocks may also be placed on other components of the machine, including the ice elevator 172 and elevator auger motor 175. A safety switch may also insure that the bin agitator 180 is not overloaded by shutting down power to the agitator motor 174 in case of an overload.

Dispensing switch 321, activated by actuating lever 109 (see FIG. 1) may interface with the microprocessor controller 309 to begin the auger motor 175 and afterwards to stop the auger motor when a user wishes to dispense ice. The circuit board 303 may also mount transformers 313, 315 for reducing the input voltage to useful voltages, such as transformer 313 for providing 12V or 24V for control purposes and transformer 315 for providing 24V AC for beverage valves. Wiring harness 327 may provide 24V power to a conversion circuit 323 for powering solenoids 325 for soda valves 104. Shielding 329 may be provided for power lines to and from transformers 313, 315. Circuit board 305 contains controls for operating the carbonator 168. Included may be relay 331 for providing power to the carbonator pump motor 198. There may also be controls 333, such as a microprocessor, for receiving a signal from a carbonator level sensor 196. Controls 333 may respond to the carbonator level sensor low and high level signals to supply or stop water to the carbonator. In this embodiment, the microprocessor 333 also receives a signal from the ice thickness sensor 221, used primarily to signal the ice making components to begin a harvest cycle. Other features may be added to these controls.

Figure 18:
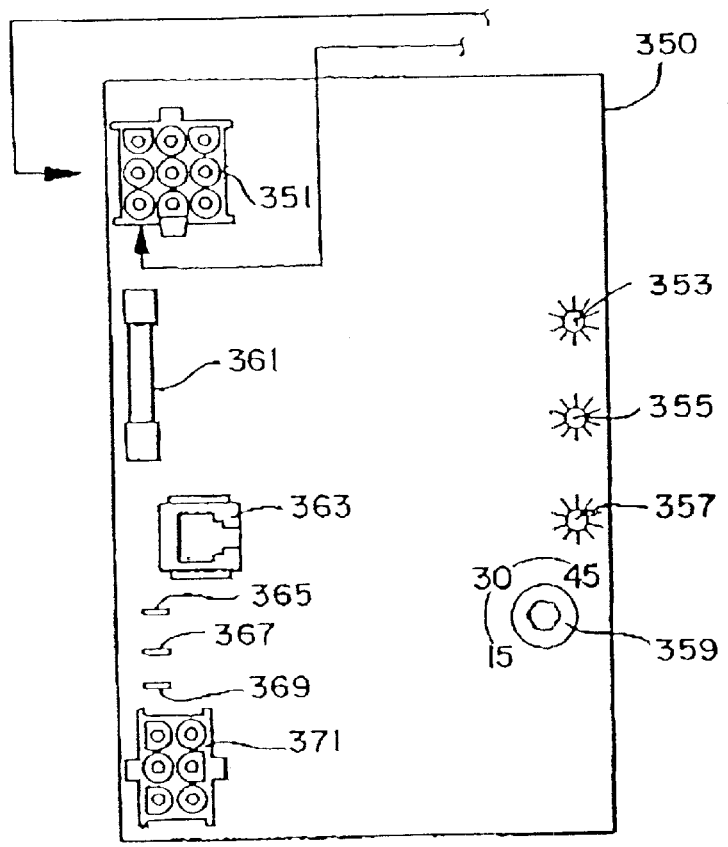
FIGS. 18–21 are schematic diagrams of the electrical system for the ice maker of FIG. 7.

FIG. 18 depicts a control board 350 for use with the ice machine. Lights 353, 355 and 357 indicate, respectively, whether the water level is low, whether the ice bin is full, and whether the machine is in a harvest mode, in machines having a water low level sensor and an ice bin full sensor. A signal from the ice bin sensor may signal the ice making machine to cease making ice. There is also a timing adjustment 359 for a water purge that occurs between each freezing cycle. The control system fuse 361 and accessory plug 363 are also found on the control board, as are the AC line voltage electrical plug 351 and DC low voltage electrical plug 371. The control board also includes spade terminations 365, 367 and 369 respectively for an ice thickness probe, water level probe and an extra ground wire for a possible cleaning system.

Figure 19:
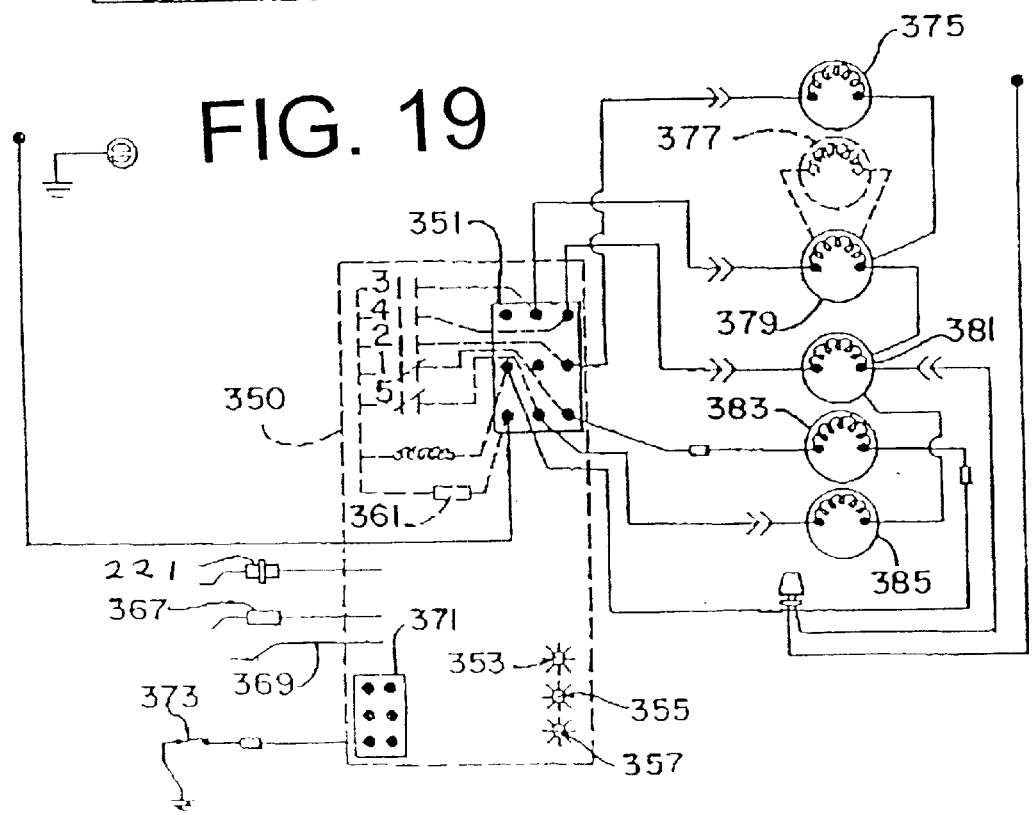

FIG. 19 is a wiring diagram for the ice making unit. In addition to the control board 350 and many of its components, FIG. 19 shows wiring for a bin switch 373. Also depicted are ice thickness probe 221, water level probe 367, and an extra ground wire 369. FIG. 19 also shows the solenoid coil 375 for a water solenoid valve, solenoid coil 379 for vapor solenoid valve 227 (and in dotted lines, a second solenoid 377 when dual evaporators and a second vapor solenoid valve are used), a coil 381 for a water dump valve, solenoid coil 383 for water pump 230, and solenoid coil 385 for liquid line solenoid valve 219.

Figure 20:
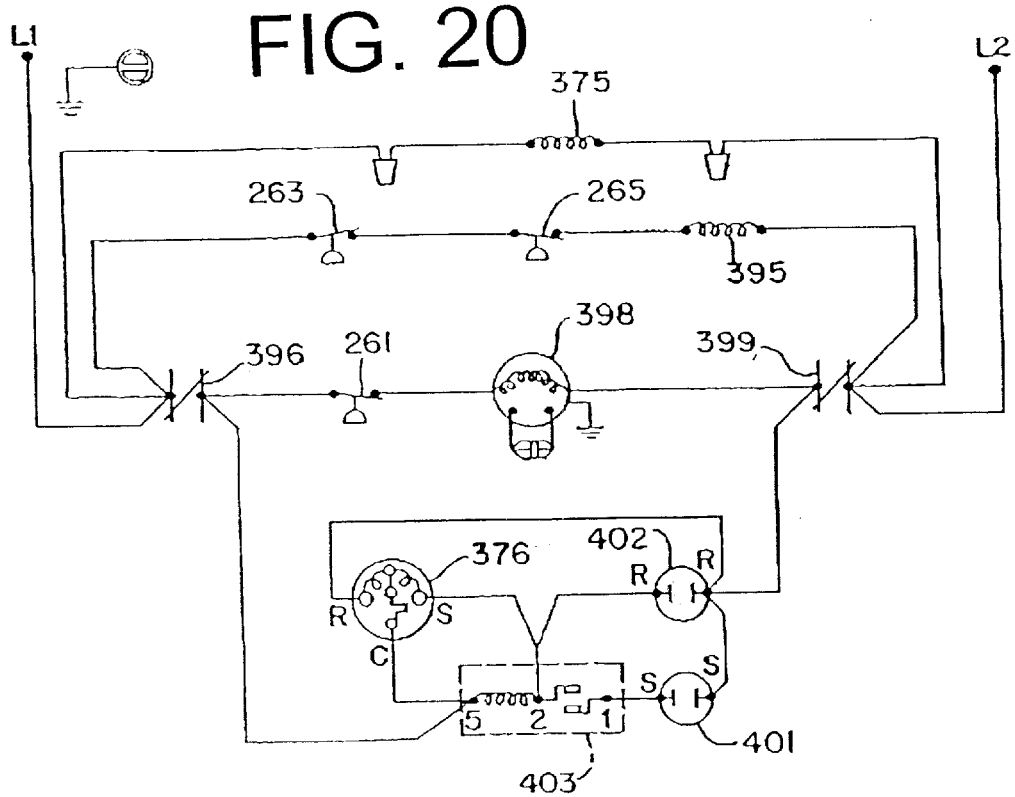
Figure 21:
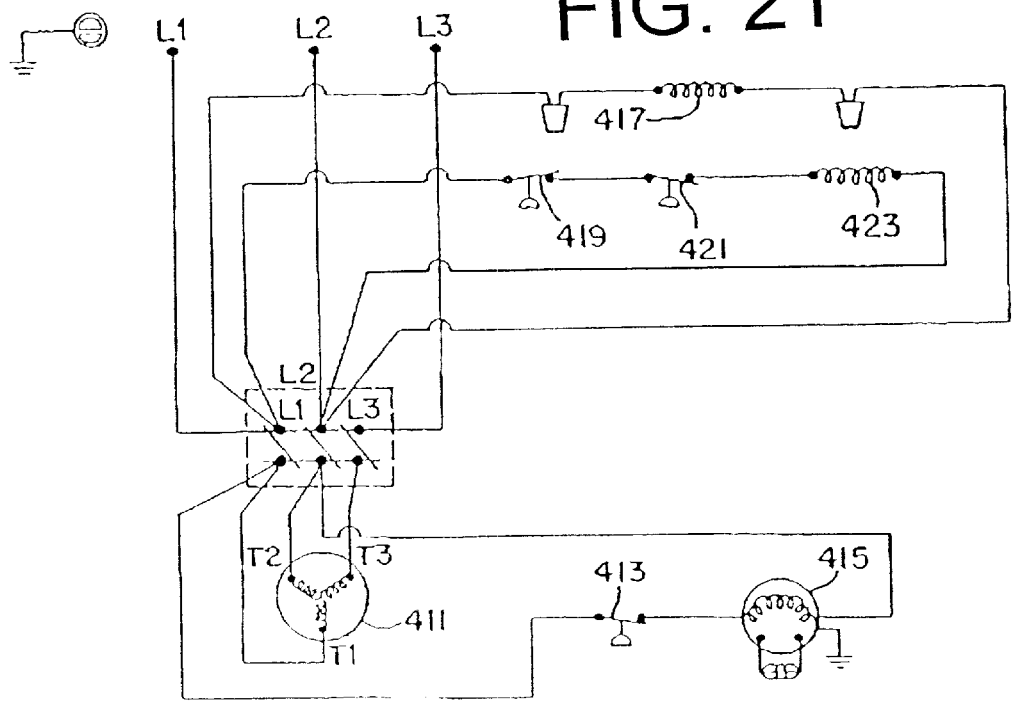

FIG. 20 is a wiring diagram showing the circuits for the condensing and compressing unit using 230V single phase alternating current. The wiring for compressor main motor 376 is shown, along with a crank case heater 375. The high pressure cut out 263, low pressure cut out 265, fan cycle control 261 and condenser fan motor 398 with a built in run capacitor are also shown, along with the compressor run capacitor 402 and start capacitor 401. A relay 403, a contactor coil 395 and contactor contacts 396 and 399 are also shown. FIG. 21 is a wiring diagram for the condensing unit using 230V three phase alternating current. Three phase compressor motor 411 receives line power from three phase lines, L1, L2 L3. The condenser fan motor 415 and fan cycle control 413 may use single phase power as shown. Compressor crank case heater 417 is also powered by a single phase. Motor 411 is protected by low pressure cut out 419 and high pressure cutout 421. Contactor coil 423 is also shown. A signal or alarm from any of the relays, sensors, or cut-outs may signal the refrigeration equipment to stop, thus stopping the ice-making process as well.

FIGS. 1 and 3 depict free-standing models and housings of the beverage dispenser with integral ice-making capability. There is also a built-in version of this beverage dispenser, in which only the top portion of the dispenser is visible to the consumer, with the rest of the dispenser being under a counter. FIG. 23 depicts the top part of a "built-in" version of the beverage dispenser with integral ice-making capability 240. The beverage dispenser has an upper housing 242 suitable for use in a "built-in" version. The dispenser has many other parts in common with the free-standing version, including valves 104, actuating levers 106, nozzles 110, drip pan 107, ice dispenser outlet 108 and ice dispenser actuating lever 109. In both the free-standing and built-in models, most parts are "under the counter," that is, below the area for dispensing ice and a beverage. In the built-in version, the portion below the counter may not have the lower housing panels that are depicted in the free-standing versions. Thus, a housing according to embodiments of the present invention may be a housing for a free-standing model, including an upper housing and side panels for a lower portion of the beverage dispenser, or the housing may include an upper housing only for a built-in model of the beverage dispenser, with the counter and the area under it, including possibly a front panel hiding the equipment from consumers, serving as the remainder of the "housing."

Figure 24:
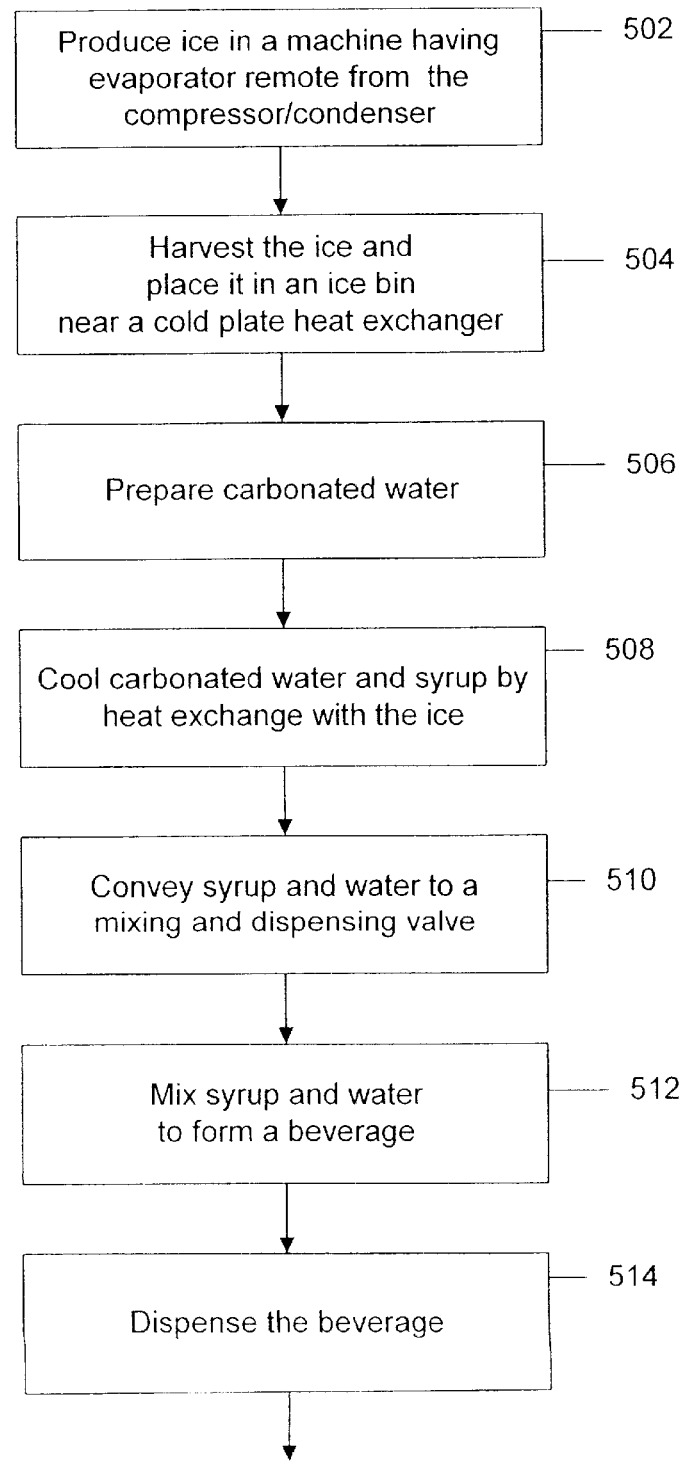
FIG. 24 is a flow chart for a method of practicing the invention.

FIG. 24 is a method 500 of practicing the invention. The method includes producing ice in a refrigeration system having an evaporator remote from the compressor and condenser 502. The method then includes harvesting the ice and storing the ice in an ice bin 504, which serves as a cold plate heat exchanger. The method then includes preparing carbonated water 506 and cooling carbonated water and syrup by exchanging heat between the ice and the carbonated water and syrup 508. The syrup and carbonated water are then conveyed to a mixing and dispensing valve 510, wherein the conveying may be by pumping or by fluid pressure. The syrup and water are then mixed 512 to form a beverage, and the beverage is dispensed 514 by a dispensing portion of the same machine that produces the ice.

As can be seen from the above description and drawings, the compressor and condenser of the ice-making equipment are located remotely from the ice-harvesting and beverage-dispensing functions of the soft drink dispenser. The serving or dining area is thus much more likely to be quiet and peaceful than otherwise. It is not necessary to climb on a ladder with a bucket of ice to replenish the ice supply, and thus sanitary conditions may more likely apply to this type of beverage dispenser. The invention may also be used to make an ice dispenser with an integral ice maker where beverage dispensing is not desired, but a self-contained, quiet ice dispenser is needed.

There are many ways to practice this invention. Depending on the individual circumstances of each establishment, a free-standing version or a built-in counter version of the soft drink dispenser with integral ice making capability may be desired. The capacity of an individual machine may be expanded by using a larger remote compressor and condenser. More ice making capability may be made available in the dining or serving area by adding an additional evaporator and ice-making mold if desired. Internally, the diameters and heights of the receiver or receivers may be varied to allow for whatever operating conditions may apply. The cold plate used to exchange heat from the ice and to chill soft drink syrup and carbonated water may be made larger or smaller, and the enclosed coils longer or shorter, in accordance with the expected capacity and performance desired. The invention may also be practiced without using vapor defrosting, and instead using hot gas from the compressor to defrost the evaporator and harvest the ice. This method will not take full advantage of the capability of the available equipment, to save energy and cost, for instance, but may be used.

The ice bin may be operated with or without an ice bin "full" sensor, relying instead on temperature, manual shutoff or other technique to cease ice-making. The compressor and any fan used for the condenser may be operated on single phase electricity or on three-phase electricity for units with larger capacity. Carbonator and valve dispensing systems may be electrical/electronic or may rely completely on carbon dioxide pressure for powering the carbonated water and syrup systems. As one example, a ratiometric valve may rely on carbon dioxide pressure to move a dispensing piston that rations carbonated water. A second piston ganged to the carbonated water piston may supply about ⅕ the volume of the carbonated water as soft drink syrup, thus post-mixing a soft drink.

Accordingly, it is the intention of the applicants to protect all variations and modifications within the valid scope of the present invention. It is intended that the invention be defined by the following claims, including all equivalents. While the invention has been described with reference to particular embodiments, those of skill in the art will recognize modifications of structure, materials, procedure and the like that will fall within the scope of the invention and the following claims.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A beverage dispenser with an integral ice maker comprising:
   a) a water system including at least one pump, an ice-forming surface, and interconnecting lines therefor;
   b) a refrigeration system with a compressor, a condenser, at least one evaporator in heat exchange relationship with the ice forming surface, and at least one receiver having an inlet connected to the condenser, a liquid outlet connected to an expansion device, and a vapor outlet connected by a valved passageway to the evaporator, wherein the compressor and the condenser are remote from the evaporator;
   c) an ice bin for receiving ice made by the water system and the refrigeration system; and
   d) at least one mixing valve for mixing and dispensing syrup and carbonated water chilled by ice made by the refrigeration system; and
   e) a housing, wherein the water system, at least a portion of the refrigeration system, and the ice bin are located within the housing.

2. The beverage dispenser of claim 1 further comprising at least one heat exchanger in thermal contact with the ice bin.

3. The beverage dispenser of claim 1 further comprising a carbonator and a carbonator pump for making carbonated water.

4. The beverage dispenser of claim 3 further comprising a prechiller within the housing, the prechiller located between the carbonator pump and a location selected from the group consisting of a source of incoming water and the carbonator.

5. The beverage dispenser of claim 4 wherein the prechiller comprises a coil of circulating water in heat exchange relationship with ice from the ice bin, and a container for holding the ice.

6. The beverage dispenser of claim 1 wherein an ice making portion of the beverage dispenser is located behind a portion for dispensing a soft drink.

7. The beverage dispenser of claim 2 wherein the heat exchanger comprises an aluminum casting with separate flow passages for at least one of water, syrup, and carbonated water.

8. The beverage dispenser of claim 7 wherein the flow passages are coils of stainless steel tubing.

9. The beverage dispenser of claim 1 further comprising an ice dispenser receiving and dispensing ice from the ice bin.

10. The beverage dispenser of claim 9 further comprising an agitator within the ice bin, a motor for rotating the agitator, and an elevator for lifting ice from the ice bin to the ice dispenser.

11. The beverage dispenser of claim 10 wherein the elevator includes an auger in a tube and a motor for rotating the auger.

12. The beverage dispenser of claim 1 wherein the at least one mixing valve comprises a ratio control valve, which draws syrup from a source of the syrup to the mixing valve.

13. The beverage dispenser of claim 1 further comprising at least one mixing and dispensing valve connected to a source of non-carbonated water for dispensing a non-carbonated beverage.

14. The beverage dispenser of claim 1 wherein the beverage dispenser and ice maker constitute a built-in model and are contained within a housing configured with an under counter ice bin and an above counter beverage dispensing portion.

15. The beverage dispenser of claim 1 wherein the refrigeration system comprises at least two receivers and further comprising a receiver equalizer line connecting the at least two receivers.

16. The beverage dispenser of claim 1 wherein the at least one receiver is generally cylindrical in shape with a wall and two ends, and with lines for an inlet, a vapor outlet and a liquid outlet all passing through one end of the cylinder.

17. The beverage dispenser of claim 16 wherein the receiver liquid outlet is a tube extending to near the bottom of the at least one receiver, and the vapor outlet is a tube extending to near the top of the at least one receiver.

18. The beverage dispenser of claim 1 further comprising a head pressure control valve located between the condenser and the at least one receiver to allow gas from the compressor to bypass the condenser and enter the at least one receiver.

19. The beverage dispenser of claim 3 further comprising a pump for recycling carbonated water to the carbonator.

20. The beverage dispenser of claim 1 wherein the valved passageway comprises a solenoid valve.

21. A method of producing and dispensing a beverage, the method comprising:
a) producing ice with a refrigeration system having an evaporator remote from a compressor and a condenser, the evaporator being housed inside a housing that also houses a beverage dispenser;
b) harvesting and storing said ice adjacent to a heat exchanger;
c) cooling water and syrup in said heat exchanger by exchanging heat with said ice;
d) mixing cooled water and syrup to form a beverage; and
e) dispensing said beverage.

22. The method of claim 21 further comprising carbonating the water used to mix the beverage.

23. The method of claim 21 wherein a casual drink is dispensed at a temperature as low as 38° F.

24. The method of claim 21 further comprising releasing ice from an ice making mold by heating the evaporator with vaporous refrigerant from a receiver.

25. The method of claim 21 further comprising drawing syrup and carbonated water for said mixing and dispensing steps by using a ratio control valve.

26. The method of claim 21 further comprising cooling and dispensing a second beverage wherein the second beverage is a single-component beverage by exchanging heat in the second beverage with the ice, and dispensing the cooled single-component beverage.

27. The method of claim 21 further comprising dispensing ice into a container upon command from a user.

28. The method of claim 22 further comprising chilling water selected from the group consisting of incoming water or only water to be carbonated.

29. A beverage dispenser with an integral ice maker comprising:
a) a housing;
b) a carbonation system comprising a carbonator within the housing and connections to sources of carbon dioxide and water, and a carbonator pump within the housing for pumping carbonated water;
c) a water system within the housing comprising a water pump and ice-forming equipment;
d) a refrigeration system having an evaporator, a condenser, a compressor, an expansion device, and at least one receiver, the evaporator being located within the housing and the condenser and compressor being located outside the housing, and the at least one receiver having an inlet connected to the condenser, a vapor outlet connected to the evaporator by a valved passageway, and a liquid outlet connected to the expansion device which is connected in turn to the evaporator;
e) an ice bin within the housing for receiving ice made by the refrigeration system; and
f) a beverage dispensing system within the housing, the dispensing system comprising at least two mixing valves and interconnecting lines between said valves and a source of syrup and a water source, at least one of said mixing valves receiving syrup and carbonated water, wherein the interconnecting lines between the mixing valves and the syrup source and the water source are in heat exchange relationship with the ice bin.

30. The beverage dispenser of claim 29 further comprising a block valve for mounting each of the at least two mixing valves.

31. The beverage dispenser of claim 29 further comprising a water selection manifold between piping for water and carbonated water and the mixing and dispensing valves.

32. The beverage dispenser of claim 29 wherein the heat exchange relationship between the interconnecting syrup and water lines and the ice bin comprises an aluminum casting with separate flow passages for water and syrup.

33. The beverage dispenser or claim 32 wherein the passages comprise tubing around which aluminum is cast.

34. The beverage dispenser of claim 29 wherein the ice is released into the ice bin by heating the evaporator with vaporous refrigerant from the refrigeration system.

35. The beverage dispenser of claim 29 further comprising a high/low sensor for the carbonator connected to a controller for the carbonator.

36. The beverage dispenser of claim 29 wherein at least one of said valves is connected to a source of non-carbonated water and dispenses a non-carbonated beverage.

37. The beverage dispenser of claim 29 wherein each of the at least two mixing valves comprises a ratio control valve that draws syrup to the mixing valve.

38. The beverage dispenser of claim 29 wherein the source of carbon dioxide comprises a carbon dioxide tank connected to the carbonator.

39. The beverage dispenser of claim 29 wherein the at least one receiver comprises a plurality of receivers and piping connecting each of the receivers.

40. The beverage dispenser of claim 29 wherein the at least one receiver is generally cylindrical in shape with a wall and two ends, and with lines for an inlet, a vapor outlet and a liquid outlet all passing through one end of the cylinder.

41. The beverage dispenser of claim 29 wherein the liquid outlet is a tube extending to near the bottom of the at least one receiver and the vapor outlet is a tube extending to near the top of the at least one receiver.

42. The beverage dispenser of claim 29 further comprising a head pressure control valve located between the condenser and the at least one receiver to allow gas from the compressor to bypass the condenser and enter the receiver.

43. The beverage dispenser of claim 29 wherein the valved passageway comprises a solenoid valve.

44. The beverage dispenser of claim 29, wherein the at least one receiver is located within the housing.

45. The dispensing system of claim 29 further comprising a prechiller within the housing, the prechiller located between the carbonator pump and a location selected from the group consisting of a source of incoming water and the carbonator.

46. The dispensing system of claim 45 wherein the prechiller comprises a coil of circulating water in heat exchange relationship with ice from the ice bin, and a container for holding the ice.

47. A method of producing and dispensing a beverage, the method comprising:
   a) producing ice with a refrigeration system having an evaporator remote from a compressor and a condenser, wherein the evaporator is housed inside a beverage dispenser housing;
   b) harvesting the ice into an ice bin;
   c) cooling water and syrup by exchanging heat with said ice and carbonating said water;
   d) conveying said carbonated water and syrup to a mixing and dispensing valve;
   e) mixing cooled carbonated water and syrup to form a beverage; and
   f) dispensing said beverage.

48. The method of claim 47 further comprising dispensing the beverage at a temperature as low as 38° F.

49. The method of claim 47 further comprising dispensing ice from the ice bin into a container upon command from a user.

50. The method of claim 47 wherein the dispensing is accomplished by a ratio control valve.

51. The method of claim 47 further comprising ceasing to make ice upon a signal selected from the group consisting of an ice bin full signal and an alarm from the refrigeration system.

52. The method of claim 47 wherein the ice is harvested by supplying vaporous refrigerant to the evaporator.

53. The method of claim 52 wherein the vaporous refrigerant is routed to the evaporator from a receiver in the refrigeration system, said refrigerant routed to the receiver from a source selected from the group consisting of a condenser and a head pressure control valve.

54. The method of claim 47 further comprising prechilling water selected from the group consisting of incoming water and water to be carbonated.

55. A beverage dispenser with an integral ice maker comprising:
   a) a housing;
   b) a carbonator within the housing connected to a source of carbon dioxide and a source of water.
   c) a water system inside the housing, the water system comprising a water pump and an ice-form lug mold;
   d) a refrigeration system having an evaporator inside the housing, a condenser and a compressor both located remotely from the evaporator, and a receiver with a vapor outlet connected to the evaporator by a valved passageway and a liquid outlet connected to an expansion device near the evaporator;
   e) an ice bin within the housing for receiving ice made by the refrigeration system; and
   f) a dispensing system within the housing comprising at least two mixing valves and interconnecting lines between said valves and the sources of syrup and water, at least one mixing valve receiving syrup and carbonated water, wherein the interconnecting lines between the mixing valves and the syrup and carbonated water are in heat exchange relationship with the ice bin.

56. The beverage dispenser of claim 55 wherein the condenser and compressor are located together in a single cabinet.

57. The beverage dispenser of claim 55 wherein the receiver is located in the housing with the evaporator.

58. The beverage dispenser of claim 55 wherein the heat exchange relationship is provided by a cold plate heat exchanger located under the ice in the ice bin, the cold plate having embedded interconnecting lines for the syrup and carbonated water.

59. The beverage dispenser of claim 55 further comprising a water selection manifold between the at least one mixing valve and interconnecting lines for carbonated and non-carbonated water.

60. An ice making aid dispensing machine, comprising:
   a) a water system including at least one pump, at least one ice-forming mold, and interconnecting lines therefor,
   b) a refrigeration system for making ice with water from the water system, the refrigeration system comprising a compressor, a condenser, at least one evaporator in heat exchange relationship with the at least one ice forming mold, and at least one receiver having an inlet connected to the condenser, a liquid outlet connected to an expansion device, and a vapor outlet connected by a valved passageway to the evaporator, wherein the compressor and the condenser are located remotely from the evaporator;
   c) an ice bin for receiving ice made by the water system and the refrigeration system;
   d) an ice dispensing system for dispensing ice from the ice bin; and
   e) a housing, wherein the water system, at least a portion of the refrigeration system the ice bin, and the ice dispensing system are located within the housing.

61. The ice making and dispensing machine of claim 60 further comprising al agitator and motor for the ice bin and wherein the ice dispenser includes an elevator for lifting ice from the ice bin to the ice dispensing system.

62. The ice making and dispensing machine of claim 60 wherein the elevator includes an auger in a tube and a motor for rotating the auger.

63. A beverage dispenser with an integral ice maker comprising:
- a) a water system including at least one pump, at least one ice-forming mold, and interconnecting lines therefor;
- b) a refrigeration system having at least one evaporator in heat exchange relationship with the ice forming mold, at least one receiver having an inlet connected lo a condenser, a liquid outlet connected to an expansion device, and a vapor outlet connected to the at least one evaporator by a valved passageway, and wherein a compressor draws refrigerant from the at least one evaporator and supplies compressed refrigerant to the condenser, the compressor and condenser both being located remotely from the evaporator;
- c) an ice bin for receiving ice made by the water system and the refrigeration system;
- d) at least one mixing valve for mixing and dispensing carbonated water and syrup, said carbonated water and syrup being chilled by ice from the ice bin, and
- e) a housing containing the water system, the at least one evaporator, the ice bin, and the at least one mixing valve.

64. A beverage dispenser with an integral ice maker comprising:
- a) a housing;
- b) a carbonator within the housing connected to sources of carbon dioxide and water, and at least one pump within the housing for pumping water;
- c) a water system within the housing comprising a water pump and an ice-forming mold;
- d) a refrigeration system having at least one evaporator within the housing and at least one receiver, a condenser and a compressor, the evaporator being located within the housing and the compressor and condenser being located remotely from the evaporator, wherein the receiver has an inlet connected to the condenser, a liquid outlet connected to an expansion device, and a vapor outlet connected by a valved passageway to the evaporator;
- e) an ice bin within the housing for receiving ice made by the refrigeration system; and
- f) a dispensing system within the housing, the dispensing system comprising at least two mixing valves and interconnecting lines between said valves and a source of syrup and a water source, at least one mixing valve receiving syrup and carbonated water, wherein the interconnecting lines between the mixing valves and the syrup source and water source are in heat exchange relationship with the ice bin.

65. The beverage dispenser of claim 64 further comprising a prechiller within the housing, the prechiller comprising a coil of circulating water in heat exchange relationship with ice from the ice bin.

66. The beverage dispenser of claim 64 wherein the at least one pump is selected from the group consisting of a pump for pumping incoming water to the carbonator and a pump for pumping carbonated water.

67. The beverage dispenser of claim 1, wherein the ice-forming surface comprises an ice-forming mold.

68. The beverage dispenser of claim 1 wherein the at least one mixing valve is located at about the same height as the refrigeration system.

69. The method of claim 21 wherein the beverage is formed and dispensed at about the same height as the evaporator.

70. The beverage dispenser of claim 29 wherein the at least two mixing valves arc located at about the same height as the refrigeration system.

71. The method of claim 47 wherein the beverage is formed and dispensed at about the same height as the evaporator.

72. The beverage dispenser of claim 55 wherein the at least two mixing valves are located at about the same height as the refrigeration system.

73. The beverage dispenser of claim 64 wherein the dispensing system is at about the same height as the refrigeration system.

* * * * *